US010505711B2

(12) United States Patent
Thiebeauld de La Crouee et al.

(10) Patent No.: US 10,505,711 B2
(45) Date of Patent: Dec. 10, 2019

(54) METHOD OF PROTECTING A CIRCUIT AGAINST A SIDE-CHANNEL ANALYSIS

(71) Applicant: ESHARD, Martillac (FR)

(72) Inventors: Hugues Thiebeauld de La Crouee, Pessac (FR); Antoine Wurcker, Villenave d'Ornon (FR)

(73) Assignee: ESHARD, Martillac (FR)

( * ) Notice: Subject to any disclaimer, the term of this patent is extended or adjusted under 35 U.S.C. 154(b) by 179 days.

(21) Appl. No.: 15/439,562

(22) Filed: Feb. 22, 2017

(65) Prior Publication Data

US 2017/0244552 A1    Aug. 24, 2017

(30) Foreign Application Priority Data

Feb. 22, 2016 (FR) ..................................... 16 51443
Feb. 22, 2016 (FR) ..................................... 16 51444
Feb. 22, 2016 (FR) ..................................... 16 51445

(51) Int. Cl.
*H04L 9/00* (2006.01)
*G01R 31/317* (2006.01)
(Continued)

(52) U.S. Cl.
CPC ........ *H04L 9/003* (2013.01); *G01R 31/31719* (2013.01); *G06F 21/72* (2013.01);
(Continued)

(58) Field of Classification Search
CPC ......... H04L 9/003; H04L 9/06; H04L 9/0637; H04L 9/0631; G09C 1/00; G06F 21/60; H04K 1/02
(Continued)

(56) References Cited

U.S. PATENT DOCUMENTS 5,995,747 A * 11/1999 Guttag ................ G06F 12/0284
708/230
6,760,440 B1 * 7/2004 Driscoll ................ H04L 9/0662
380/37

(Continued)

FOREIGN PATENT DOCUMENTS

| EP | 1267514 A2 | 12/2002 |
|----|------------|---------|
| FR | 2873523 A1 | 1/2006  |
| FR | 2893796 A1 | 5/2007  |

OTHER PUBLICATIONS

Jacques Fournier et al., Design and characterisation of an AES chip embedding countermeasures, 2011, International Journal of Intelligent Engineering Informatics, 2011 vol. 1 No. 3/4, pp. 328-347.*

(Continued)

*Primary Examiner* — Farid Homayounmehr
*Assistant Examiner* — Raied A Salman
(74) *Attorney, Agent, or Firm* — Brake Hughes Bellermann LLP

(57) ABSTRACT

In a general aspect, a method for executing a target operation combining a first input data with a second input data, and providing an output data can include generating at least two pairs of input words each comprising a first input word and a second input word and applying to each pair of input words a same derived operation providing an output word including a part of the output data resulting from the application of the target operation to first and second input data parts present in the pair of input words, and a binary one's complement of the output data part.

26 Claims, 14 Drawing Sheets

(51) Int. Cl.
*G09C 1/00* (2006.01)
*G06F 21/72* (2013.01)
*H04L 9/32* (2006.01)
*G06F 21/75* (2013.01)

(52) U.S. Cl.
CPC ............... *G09C 1/00* (2013.01); *H04L 9/002* (2013.01); *H04L 9/3242* (2013.01); *H04L 9/3247* (2013.01); *H04L 9/3249* (2013.01); *H04L 9/3252* (2013.01); *G06F 21/75* (2013.01); *H04L 2209/08* (2013.01); *H04L 2209/12* (2013.01)

(58) Field of Classification Search
USPC .................................. 713/189, 168; 380/37
See application file for complete search history.

(56) References Cited

U.S. PATENT DOCUMENTS

| | | | | |
|---|---|---|---|---|
| 8,328,109 | B2* | 12/2012 | Lapstun | G06K 7/10772 235/456 |
| 9,524,399 | B1* | 12/2016 | Takahashi | G06F 21/72 |
| 10,230,521 | B2* | 3/2019 | Wurcker | H04L 9/002 |
| 2003/0223580 | A1 | 12/2003 | Snell | |
| 2005/0036618 | A1* | 2/2005 | Gammel | G06F 7/00 380/255 |
| 2005/0134491 | A1* | 6/2005 | Huang | H03L 7/093 341/143 |
| 2007/0230688 | A1* | 10/2007 | Tajima | H04L 9/0858 380/30 |
| 2008/0019503 | A1 | 1/2008 | Dupaquis et al. | |
| 2008/0240443 | A1* | 10/2008 | Vuillaume | H04L 9/3247 380/277 |
| 2009/0074181 | A1 | 3/2009 | Pelletier | |
| 2010/0185336 | A1* | 7/2010 | Rovnyak | H02J 3/38 700/287 |
| 2010/0202605 | A1* | 8/2010 | Peralta | G06F 7/726 380/28 |
| 2011/0246119 | A1 | 10/2011 | Feix et al. | |
| 2013/0086328 | A1* | 4/2013 | Frank | G06F 12/0875 711/125 |
| 2014/0249799 | A1* | 9/2014 | Yih | G06F 17/277 704/9 |
| 2014/0281208 | A1* | 9/2014 | Fromm | G06F 17/30982 711/108 |
| 2015/0033014 | A1* | 1/2015 | McGrew | H04L 9/30 713/168 |
| 2015/0317475 | A1 | 11/2015 | Aguayo Gonzalez et al. | |
| 2017/0092157 | A1* | 3/2017 | Christiansen | G06F 21/602 |
| 2017/0104586 | A1* | 4/2017 | Hars | H04L 9/0637 |
| 2017/0373831 | A1* | 12/2017 | Wurcker | H04L 9/002 |
| 2018/0097618 | A1* | 4/2018 | Kumar | H04L 9/0662 |
| 2018/0137290 | A1* | 5/2018 | Kwiat | G06F 21/32 |
| 2019/0036678 | A1* | 1/2019 | Ahmed | H04L 9/006 |

OTHER PUBLICATIONS

European Search Report for International Application 17156286.1, dated Aug. 22, 2017, 5 pages.
European Search Report for International Application 17156287.9, dated Jul. 26, 2017, 7 pages.
European Search Report for International Application 17156290.3, dated Aug. 22, 2017. 4 pages.
European Search Report for International Application 17156292.9, dated Aug. 17, 2017, 4 pages.
European Search Report for International Application 17156293.7, dated Aug. 23, 2017, 4 pages.
Prouff, Emmanuel, et al., "Statistical Analysis of Second Order Differential Power Analysis", Prouff et al.; "Statistical Analysis of Second Order Differential Power Analysis"; IEEE Transactions on Computers, vol. 58, No. 6, Jun. 1, 2009, XP011250050, pp. 799-811., pp. 799-811.
Waddle, Jason, et al., "Towards Efficient Second-Order Power Analysis", Waddle et al.; "Towards Efficient Second-Order Power Analysis"; Cryptographic Hardware and Embedded Systems—CHES 2004; Springer-Verlag, Berlin/Heidelberg; Jul. 8, 2004; XP019009359; pp. 1-15., pp. 1-15.
French Search Report from FR1651443, dated Oct. 12, 2016, 2 pages.
French Search Report from FR 1651444, dated Oct. 26, 2016, 2 pages.
French Search Report from FR1651445, dated Nov. 24, 2016, 2 pages.
Agoyan, et al., Design and characterisation of an AES chip embedding countermeasures, HAL archives-ouvertes.fr (http:// hal-emse.ccsd.cnrs.fr/emse-0062440) ,Mar. 16, 2015, 22 pages.
Allibert, et al., Chicken or the Egg Computational Data Attacks or Physical Attacks, International Association for Cryptologic Research, Nov. 10, 2015, vol. 20151110: 103835, XP061019629, 26 pages.
Bouesse, et al., Path Swapping Method to Improve DPA Resistance of Quasi Delay Insensitive Asynchronous Circuits, Cryptographic Hardware and Embedded Systems—CHES 2006 Lecture Notes in Computer Science, Oct. 10, 2006, 384-398.
Feix, et al., "Defeating ISO9797-1 MAC Algo 3 by Combining Side-Channel and Brute Force Techniques", International Association for Cryptologic Research, Dept. 5, 2014, vol. 20140905:191135, XP061016892, 15 pages.
Joye, et al., Strengthening hardware AED implementations against fault attacks, IET Inf. Secur. vol. 1(3), Sep. 10, 2007, 106-110.

* cited by examiner

METHOD OF PROTECTING A CIRCUIT AGAINST A SIDE-CHANNEL ANALYSIS

CROSS REFERENCE TO RELATED APPLICATIONS

This application claims priority to French Application Numbers FR1651443, FR1651444 and FR1651445, filed Feb. 22, 2016, the disclosures of which are incorporated herein by reference.

TECHNICAL FIELD

The present disclosure relates to methods for protecting a circuit against a side channel analysis aiming to discover the value of a secret data handled by the circuit, and, in particular, a secret key used by an encryption algorithm to transform a message.

The present disclosure also relates to devices implementing cryptographic algorithms, such as secure devices (smart card integrated circuits, secure elements, secured memory cards), mobile devices (mobile phones, smartphones, Internet of Things), home automation and automotive devices, and to hardware cryptographic components integrated onto mother boards of computers and other electronic and IT equipment (USB drives, TV decoders, game consoles, etc.), or the like. The present disclosure also relates to software including an encryption operation, provided for being executed in a secure or non-secured environment.

The present disclosure also relates to circuits implementing a cryptographic algorithm such as a ciphering algorithm like DES (Data Encryption Standard) or Triple DES, AES (Advanced Encryption Standard), RSA (Rivest, Shamir and Adleman), DSA (Digital Signature Algorithm), or ECDSA (Elliptic Curve Digital Signature Algorithm). The present disclosure also relates to circuits implementing a hashing function such as HMAC (Keyed-Hash Message Authentication Code).

BACKGROUND

Microcircuits implementing a cryptographic algorithm are equipped with a central processing unit (CPU). Some are equipped with circuits dedicated to cryptographic computing, for example a cryptographic coprocessor. These microcircuits include thousands of logic gates that switch differently according to the operations executed. These switches create short variations in current consumption, for example of a few nanoseconds that can be measured. In particular, CMOS-type integrated circuits include logic gates that only consume current when they switch, i.e. when a logic node changes to 1 or to 0. Therefore, the current consumption depends on the data handled by the central unit and on its various peripherals: memory, data flowing on the data or address bus, cryptographic coprocessor, etc.

Furthermore, certain software programs produced in particular using encryption or obfuscation techniques, such as the "Whitebox Cryptography" technique, may integrate a secret data in such a way that it is very difficult to determine it by reverse engineering. Certain software programs may also receive a secret data from outside through a secure communication channel. Such microcircuits may be subjected to so-called side channel analysis attacks based on observing their current consumption, or their magnetic or electromagnetic radiation, or any other information that can be observed while a cryptographic algorithm is executed. Such attacks aim to discover the secret data they use, in particular their encryption keys. Frequent side channel attacks implement statistical analysis methods such as SPA ("Single Power Analysis"), DPA ("Differential Power Analysis"), CPA ("Correlation Power Analysis") or EMA ("ElectroMagnetic Analysis"). SPA analysis normally only requires the acquisition of a single current consumption trace. It aims to obtain information about the activity of the integrated circuit by observing the part of the consumption trace corresponding to a cryptographic computation, since the current trace varies according to the operations executed and the data handled.

Software may also undergo such side channel attacks during their execution by a circuit.

DPA and CPA analyses enable the key of an encryption algorithm to be found by acquiring numerous data or measurement traces and by statistically analyzing these traces to find the information searched for. They are based on the premise that the consumption of a CMOS-type integrated circuit varies when a bit changes from 0 to 1 in a register or on a bus, and does not vary when a bit remains equal to 0, remains equal to 1 or changes from 1 to 0 (discharge of the stray capacitance of the MOS transistor). Alternatively, it can be considered that the consumption of a CMOS-type integrated circuit varies when a bit changes from 0 to 1 or changes from 1 to 0 and does not vary when a bit remains equal to 0 or remains equal to 1. This second hypothesis enables the conventional "Hamming distance" or "Hamming weight" functions to be used to develop a consumption model that does not require the structure of the integrated circuit to be known to be applicable. DPA analysis involves amplifying this consumption difference using statistical processing on numerous consumption traces, aiming to highlight a measurement difference between two families of consumption traces distinguished according to formulated hypotheses.

CPA analysis is based on a linear current consumption model and involves computing a correlation coefficient between, firstly, the consumption points measured that form the captured consumption traces and, secondly, an estimated consumption value, computed from the linear consumption model and a hypothesis on the variable to be discovered that is handled by the microcircuit and on the value of the encryption key.

Electromagnetic analysis (EMA) is based on the principle that a microcircuit may leak information in the form of near or far field electromagnetic radiation. Given that transistors emit electromagnetic signals when their state changes, these signals can be treated like the current consumption variation signals by an analysis such as one or other of the SPA, DPA and CPA analyses.

Other side channel attacks exist, such as "Template attacks" and "Mutual Information Analysis" (MIA). All of the above-mentioned attacks are based on a time alignment of all the analyzed traces. In other words, all the measurements performed at a given time, for example from the time the execution of a command is activated by the circuit, must correspond to the same value handled by the algorithm.

To protect such circuits and the cryptographic algorithms they execute against such side channel attacks, countermeasures are generally provided. One type of counter-measure aims to avoid such a time alignment. For this purpose, these type of counter-measures introduce variations in the clock frequency supplied to the calculation circuits, or introduce dummy clock cycles or dummy operations. Another type of counter-measure involves adapting a given algorithm to be protected to render the data handled by the circuit independent of their actual values. Certain countermeasures of this type—that can be referred to as "masking-type counter-measures"—use a random mask (binary number) that is combined with another data to be protected such as the key and/or the message during the execution of the ciphering method. This type of counter-measure is effective but requires the algorithm to be modified, and thus requires a coprocessor specially provided for its implementation in the case of execution by a dedicated coprocessor, or a more complex program in the case of execution by the central processing unit of the microcircuit or a programmed coprocessor.

A counter-measure by multiple executions can be implemented with a conventional coprocessor not including any counter-measure means. It merely involves executing the ciphering method several times by means of false keys or false messages. For this purpose, a counter-measure program is provided for example that controls the ciphering program or the coprocessor, and makes it execute the ciphering method several times with the false keys, in a random order, such that the execution of the ciphering method with the right key (i.e. the authentic key) is "hidden" in a set of dummy executions. This counter-measure, by multiple executions, offers the advantage that it can be implemented with a conventional coprocessor not including any counter-measure means.

Other counter measures implement architectures including dual or multiples data paths, such that when a bit is computed in one data path, another data path computes the complemented value of this bit.

To check the level of security offered by a secure integrated circuit intended to be marketed, qualification and/or certification tests are planned before the circuit is marketed, where these tests can include tests of the robustness of the integrated circuit to side channel analyses aiming to discover the secret data handled by the integrated circuit. There are also tests enabling the resistance of a software program to side channel attacks to be assessed.

SUMMARY

Some embodiments relate to a method for executing, by a circuit, a target operation combining a first input data with a second input data, and providing an output data, the method including: generating at least two pairs of input words each including a first input word and a second input word, the first input word including a respective part of the first input data and a binary one's complement of the first input data part, the second input word including a respective part of the second input data and a binary one's complement of the second input data part, the parts of the first and second input data being in same positions in the first and second input data words of each word data pair, and the binary one's complements of the parts of the first and second input data being in same positions in the first and second input data words of each word data pair, and applying to each pair of input words a same derived operation providing an output word a part of the output data, resulting from the application of the target operation to the first and second input data parts present in the pair of input words, and a binary one's complement of the output data part.

According to one embodiment, each of the input words of each pair of input words can include a data resulting from a random or pseudo-random number generator.

According to one embodiment, each input data can be represented in the form of a word including several bits, each bit of each input data being inserted with its binary one's complement into a respective input word.

According to one embodiment, the positions of the data part and the position of the binary one's complement of the data part in each of the words of each pair of input words and of the output word can be chosen randomly.

According to one embodiment, the derived operation can be configured to transform the first input word of each pair of input words by replacing the binary one's complement of the input data part of the first input word by the input data part, and to apply the target operation to the transformed first input word and to the second input word of the pair of input words.

According to one embodiment, each of the input words and the output word can include two occurrences of a part of one of the two input data or of the output data, respectively, and two occurrences of the binary one's complement of the part of the input data or of the output data, respectively, the data parts being in same positions in the first and second input words of each pair of input words and in the output word, and the binary one's complements of the data part being in same positions in the first and second input words of each pair of input words and in the output word.

According to one embodiment, the derived operation can be configured to transform the first input word of each pair of input words by replacing one of the two occurrences of the input data part in the first input word by the binary one's complement of the input data part, and by replacing one of the two occurrences of the binary one's complement of the input data part in the first input word by the input data part, and to apply the target operation to the transformed first input word and to the second input word of the pair of input words.

According to one embodiment, the target operation can include one or a combination of the following operations: Exclusive OR, AND, OR, NOT AND, NOT OR, Exclusive NOT OR, and a substitution operation using a substitution table.

According to one embodiment, the derived operation can be configured to determine an index word by combining the input words of each pair of input words, and to select the output word in a table using the index word.

According to one embodiment, one of the input data can be a secret data and the other of the input data can be a data to be processed by a cryptographic operation using the secret data.

According to one embodiment, the target operation can be an operation or a combination of operations implementing the DES or AES algorithm.

Some embodiments may also relate to a circuit configured to implement the methods described above, and including a processor.

According to one embodiment, the circuit can include a coprocessor.

Some embodiments may also relate to a device including a circuit as described above and arranged on a medium.

Some embodiments may also relate to a computer program product directly loadable into a memory of a computer and including code portions which, when executed by the computer, cause the computer to implement the steps of the methods described above.

BRIEF DESCRIPTION OF THE DRAWINGS

Examples of embodiments are provided herein for illustration purposes, and are described below in relation with, but not limited to, the accompanying figures, in which.

DETAILED DESCRIPTION

In view of the drawbacks and considerations noted above, it may be desirable to have a counter-measure that enables an integrated circuit or a software program to be considered capable of being used in a product, after a qualification and/or certification process including a test method, such as those described herein.

Figure 1:
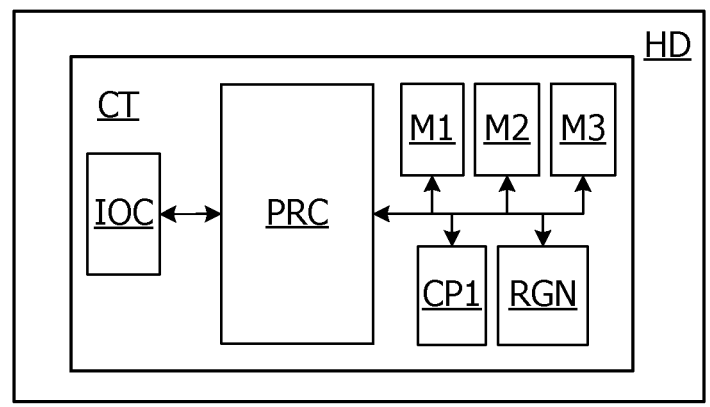
FIG. 1 schematically illustrates a conventional architecture of a secure circuit, FIG. 2 schematically illustrates an example of an integrated circuit testing system.

FIG. 1 illustrates, as an example, a secure integrated circuit CT, for example arranged on a portable medium HD such as a plastic card or any other medium, or in a terminal such as a mobile terminal, a smartphone, an IoT device or the like. The integrated circuit of this example includes a microprocessor PRC, an input/output circuit IOC, memories M1, M2, M3 coupled to the microprocessor by a data and address bus and, optionally, a cryptographic computation coprocessor CP1 or arithmetic accelerator, and a random number generator RGN. The memory M1 is a RAM-type ("Random Access Memory") memory containing volatile application data. The memory M2 is a non-volatile memory, for example an EEPROM or Flash memory, containing non-volatile data and application programs. The memory M3 is a read-only memory (or ROM memory) containing the operating system of the microprocessor.

The communication interface circuit IOC may be of contact type, for example according to the ISO/IEC 7816 standard, of contactless type with inductive coupling, for example according to the ISO/IEC 14443A/B or ISO/IEC 13693 standard, of contactless type by electrical coupling (UHF interface circuit), or of both contact and contactless type. The interface circuit IOC may also be coupled through a specific interface, to another circuit such as an NFC (Near-Field Communications) controller, or a main circuit of a terminal such as a mobile terminal or a connected object.

In some embodiments, the integrated circuit CT may be configured to execute operations of ciphering, deciphering or signing of messages that are sent to it, by means of an encryption function. This encryption function may be executed by the processor PRC of the circuit CT or partially or totally carried out by the processor PRC to the coprocessor CP1.

Figure 2:
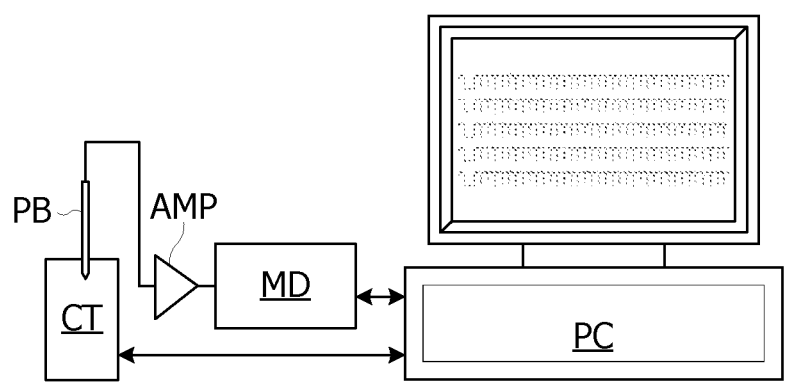

FIG. 2 illustrates an example of an integrated circuit testing system provided to implement the test method, according to one embodiment. It will be assumed, as an example, that the testing system is configured to test the integrated circuit CT in FIG. 1.

The testing system of FIG. 2 includes a measuring probe PB coupled to a measuring device MD such as a digital oscilloscope, to acquire traces relating to the activity of the circuit, such as traces of current consumption or of electromagnetic signal variation, and a computing device, such as a personal computer PC. The computer PC is coupled to the measuring device and implements a test program. This test program includes a communication interface and a program for communicating with the integrated circuit and for sending it messages, a signal processing program and a program for implementing computation steps of a method, such as the methods described herein. Steps, as used herein, can refer to operations, functions, processes, etc. In the event that the integrated circuit is a contactless circuit, the communication interface may include a contactless card reader.

The probe PB may be a current probe (for example, a resistor placed on the supply terminal Vcc of the integrated circuit), or an electromagnetic probe coupled to the measuring device by a signal amplifier AMP. Alternatively, a current probe may be combined with an electromagnetic probe. The study of electromagnetic radiation indeed shows that an electromagnetic field emitted by a circuit in operation gives information about bit switches in the integrated circuit, just like the measurement of the consumed current. The advantage of an electromagnetic probe is that it may be placed near the part of the circuit whose operation needs to be analyzed (for example near the core of the microprocessor PRC or of the cryptographic computation coprocessor CP1).

Furthermore, in the case of a contactless integrated circuit, the current probe can be replaced with an inductive probe that measures the absorption, by the integrated circuit, of the magnetic field emitted by the reader. Such an inductive probe, for example an antenna coil, can itself be combined with an electromagnetic field probe placed near the circuit zones to be studied.

Therefore, in the present application, the phrase "current consumption", used for the sake of simplifying the language, can refer to any measurable physical quantity of which the variations over time are representative of the switches of binary data inside the integrated circuit or inside the studied part of the integrated circuit, the physical quantity being able to be measured at the terminals of the integrated circuit or near the studied part of the integrated circuit. Furthermore, the physical quantity is sampled with a sampling frequency sufficiently high to collect several points per data period of interest, which, in practice, can result in traces containing from 10 to a few hundred thousand points per trace, but it may be considered to collect up to several million values, or even more per trace.

Such tests may also be intended for use in a software program or an application. In this case, the software program may be executed directly by the testing system or by an emulation program executed by the testing system. The analyzed traces may, for example, be a series of values transmitted to a memory when accessing a memory or data handled in registers of the circuit, or can be data transmitted to a communication interface of the circuit, these where transmissions can be controlled by the tested software program.

Test Method

Some embodiments of a test method can be based on a detailed review of traces of variation over time of signals or digital values, representative of the operation of the circuit to be tested while it executes an operation applied to a data to be discovered, called in the following "secret data".

Figure 3:
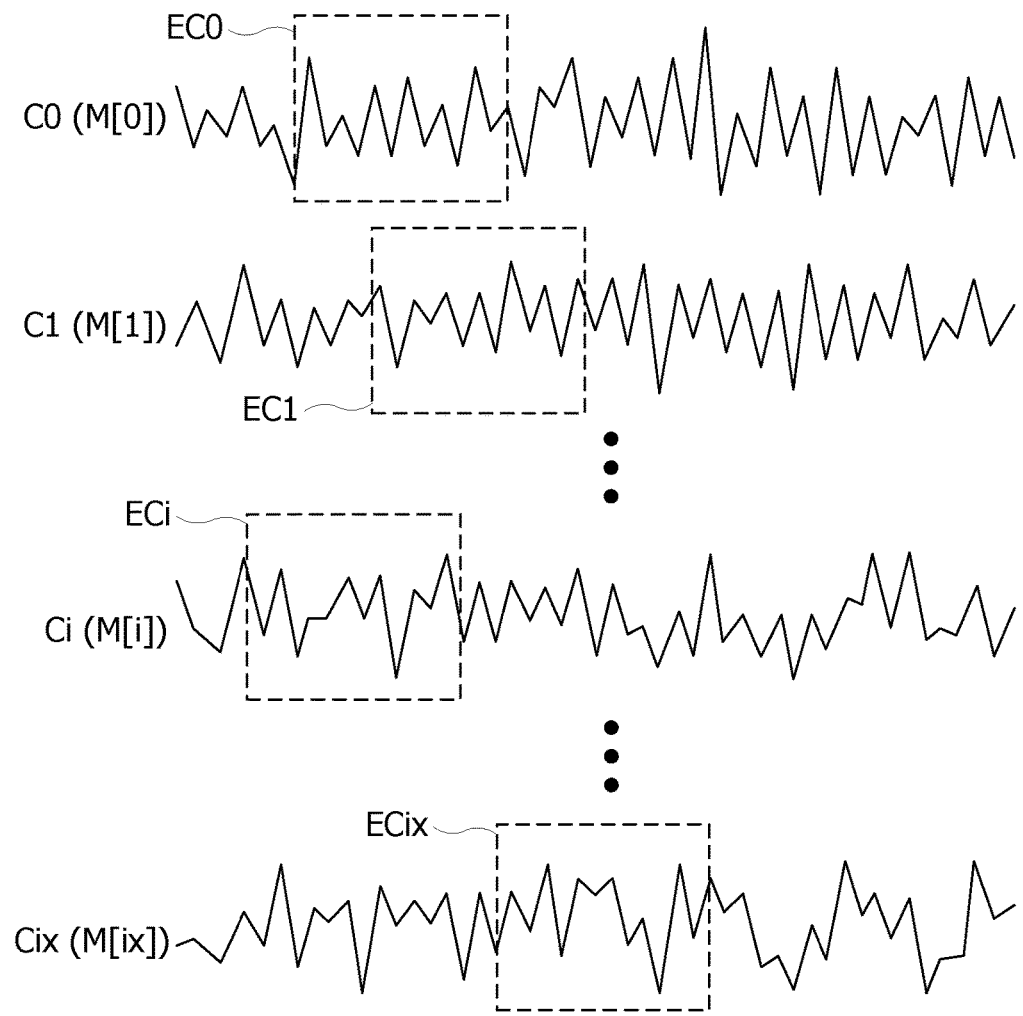
FIG. 3 illustrates traces of a signal acquired during the execution of an encryption operation by a secure circuit.

FIG. 3 illustrates traces C0, C1, . . . Cix of values over time that can be acquired by a testing system. Each of these traces can be obtained by causing an operation to be executed by the circuit or the software program to be tested. The operations corresponding to the traces C0, C1, . . . Cix are generally all different. These operations are different for example because they involve applying a same function to distinct known input data, for example messages to be ciphered, deciphered or signed or a signature to be checked, or a HMAC (keyed-Hash Message Authentication Code) to be computed. Alternatively, the known data may be output data of the function, or a part of the input and output data of this function, rather than input data thereof.

The function may be any function applied to a same secret data SD, and to an input data M, such as a symmetrical or asymmetrical encryption or decryption operation, or even a signature operation, or merely a modular or non-modular multiplication, by the secret data (M×SD), an XOR logic function (Exclusive OR) with the secret data (M XOR SD), a modular exponentiation function, the secret data being used as exponent (MSD mod n, n being known), or a modular reduction function, the secret data being used as the modulus (M mod SD). Another example of a function involves processing the result of an XOR operation with a substitution table (SBOX[M XOR SD], SBOX being the substitution table), as in the case of the DES and AES cryptographic algorithms. More generally, this function must enable a part of the value resulting from the operation to be computed based on a part of the secret data and an input data.

In the example in FIG. 3, the traces C0, C1, Ci, Cix respectively correspond to the input (or output) data M[0], M[1], . . . M[i], . . . M[ix]. Each of the traces Ci can be formed of samples acquired from a same signal measured on a same circuit under test, or can include samples from different signals, captured when the circuit under test manipulates the data M[i].

Figure 4:
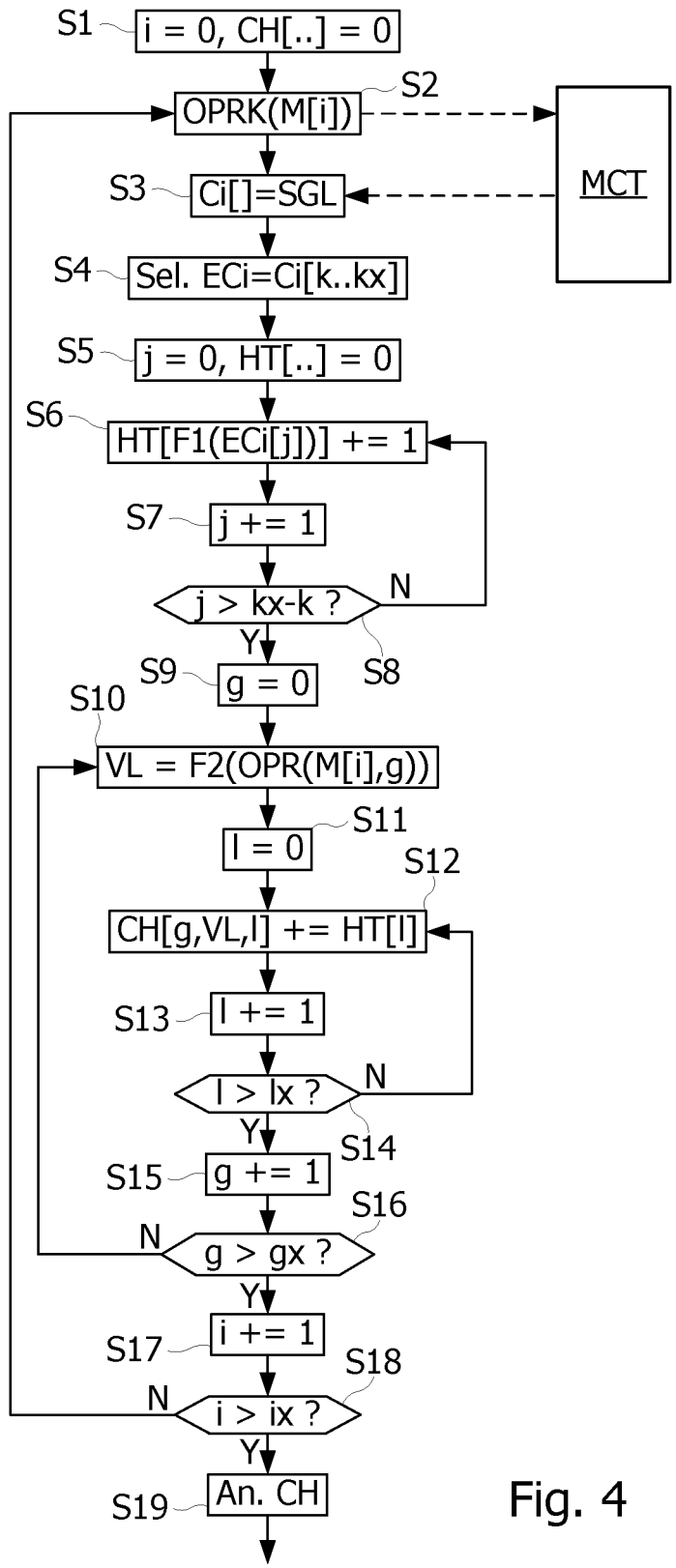
FIG. 4 illustrates a method for testing a secure circuit, according to one embodiment.

FIG. 4 illustrates steps (operations, functions, processes, etc.) S1 to S19 of processing the values collected by a testing system during the execution of an encryption operation OPRK assumed to be known, applied to a secret data to be discovered, and to input data M[0] . . . M[ix] also known. According to one embodiment, the aim of this test is to determine whether the value of the secret data leaks into (e.g., can be determined from) the collected values forming the traces of FIG. 3, for example. The processing unit PC first executes steps S1 to S8.

In step S1, the processing unit PC of the testing system sets an index i of a loop on the input data M[0] . . . M[ix] to 0, as well as a table CH. In step S2, the processing unit PC activates the execution of an operation OPRK by the circuit MCT or the software program to be tested, this operation receiving the data M[i], the secret data being provided to the operation by the circuit MCT or the software program. In step S3, the processing unit PC collects the values constituting the trace Ci. In step S4, a part ECi of the values of the trace Ci is selected, with only this part being processed in the following processing steps (FIG. 3). In the example in FIG. 4, this part is delimited by the values of the trace Ci corresponding to the indices k and kx, for the sake of simplicity. In reality, the indices k and kx may vary from one trace Ci to the next. In addition, the values thus selected in each trace are not necessarily consecutive, and the number of values in each part ECi, may be different from one trace Ci to the next, in contrast with prior side-channel analyses. Hence, it may be decided, for example, to extract only maximum or minimum local values from each trace. It is noted that the extracted part ECi may be the entire trace Ci. In the following processing, the data thus extracted are assumed to contain a piece of information concerning the secret data that is being searched for.

Figure 5:
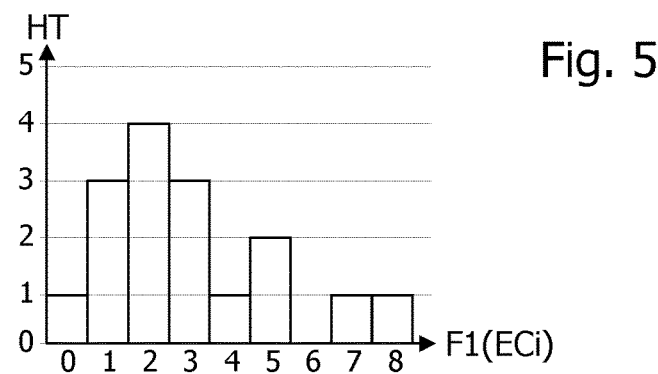
FIG. 5 illustrates, in graph form, an example of a surjective function, FIG. 6 schematically illustrates a table built according to one embodiment, to perform statistical processing.

In step S5, the processing unit PC sets a loop index j as well as a table HT to 0. In step S6, the processing unit PC applies a surjective function F1 to the value ECi[j] of index j of the selected trace part ECi and increments by one (1) a value in the table HT, designated by an index equal to the result provided by the function F1. In step S7, the index j is incremented by one (1). In step S8, the index j is compared with its maximum value to determine whether all the values of the set ECi have been processed. Once all the values of the set ECi have been processed, the processing unit PC executes the steps S9 to S14, otherwise it executes the steps S6 to S8 again. In this way, the values of the set ECi loaded in the table HT have the form of a histogram specifying the occurrence number of each possible value returned by the function F1, such that the time feature related to the values of the set ECi is not included in the table HT: the content of the table HT does not enable the order in which the values of the set have been collected to be determined. FIG. 5 represents an example of a table HT in the form of a graph occurrence numbers (in the y axis) of values (in the x axis) computed using the function F1. In the example of FIG. 5, the function F1 returns the Hamming weight computed from 8-bit encoded values.

Figure 6:
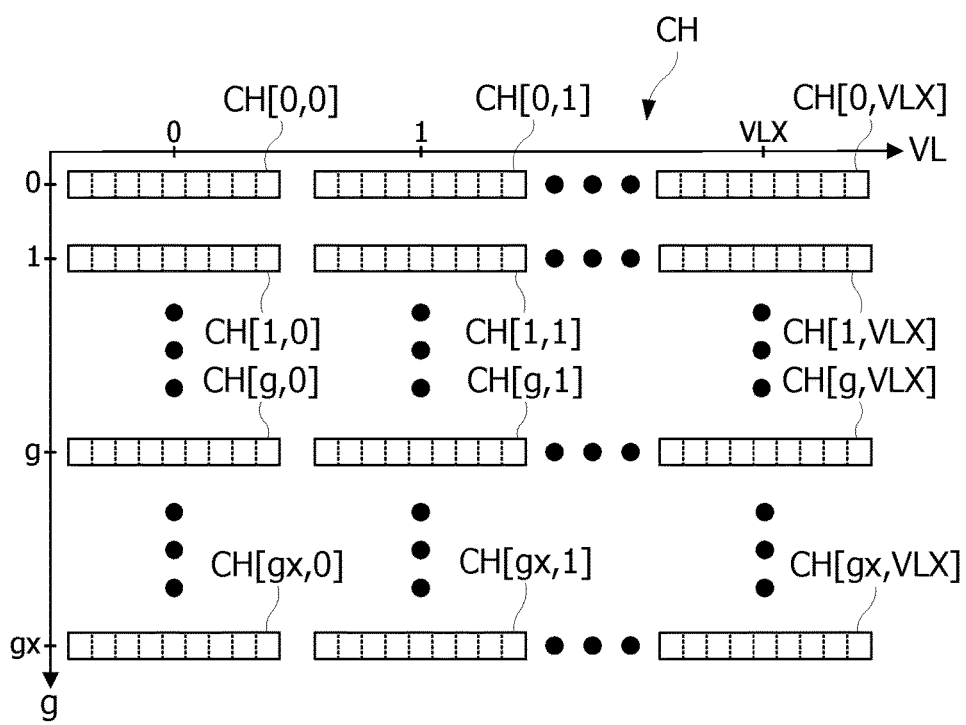

In step S9, the processing unit PC sets index g to 0. In step S10, the processing unit PC applies an operation OPR to the data M[i] and to a part of the secret data SD to be determined, set to be equal to the index g. The operation OPR(M, g) may provide a part of the result of the operation OPRK (M) (=OPR(M, SD)) executed in step S2. The result provided by the operation OPR is processed by a surjective function F2 that supplies a value VL. In step S11, the processing unit PC sets index l to 0. In step S12, the processing unit PC increments a value stored in the 3-dimensional table CH, at a location designated by the indices g, VL and l, by the value HT[l] at the index l in the table HT corresponding to the data M[i]. FIG. 6 represents an example of a table CH in which each location CH[g,VL] designated by the indices g and VL contains a table obtained by combining several tables HT according to the value VL obtained in step S11. In step S13, the index l is incremented by one (1). In step S14, the index l is compared with its maximum value lx considering the number of possible distinct values provided by the function F1. If the index l is lower than or equal to its maximum value lx, steps S12 to S14 are executed again, otherwise steps S15 and S16 are executed.

In step S15, the processing unit PC increments the index g by one (1). In step S16, the processing unit PC compares the index g with its maximum value gx, considering the number of possible distinct values for the considered part of the secret data. If the index g is lower than or equal to the maximum value gx, a new iteration from S10 to S16 is executed, otherwise steps S17 and S18 are executed. In step S17, the processing unit PC increments the index i by one (1) to process another trace Ci. In step S18, the processing unit PC compares the index i with its maximum value ix corresponding to the number of traces Ci generated. If the index i is lower than or equal to the maximum value ix, steps S2 to S18 are executed again, otherwise step S19 is executed. In step S19, each table of cumulative totals contained in the table CH at the location [g,VL] contains the following values:

$$CH[g, VL, 0..lx] = \sum_{M[i]} HT_{M[i]}[0..lx] \quad (1)$$

the data M[i] to be taken into account in the above sum being such that F2(OPR(M[i],g))=VL.

In step S19, the processing unit PC performs a statistical analysis of the table CH to determine whether a value of the index g corresponds to the part of the secret data being searched for. For this purpose, it is considered that the information resulting from a leakage of the secret data have been accumulated in the locations of a row g of the table CH, whereas the information independent from the secret data is distributed randomly or uniformly in the table CH. As a result, if a row of index g of the table CH contains higher values than in the rest of this table, the value of the index g at this row of the table CH corresponds to the value of the part of the secret data SD searched for. In this case, it can be considered that the secret data SD has leaked into the collected data forming the traces Ci.

The functions F1 and F2 can be chosen so as to correspond to the leakage pattern of the circuit or the software program to be tested. Therefore, the functions F1 and F2 may be the same or different from each other, and may be chosen to maximize (increase, etc.) the probability of discovering a secret data manipulated by the circuit. For example, the functions F1 and F2 may be one of the following functions:
the identity function,
a function (e.g. in the form F(x)=a·x+b), with a resultant value that could be reduced to a value corresponding to a Hamming weight, for example between values 0 and 8 when x is encoded on 8 bits,
a function that computes a Hamming weight of a value provided at input of the function, for example the number of bits at 1 of the binary coded value, or
a function that computes a Hamming distance with another value, for example the difference between the numbers of bits at 1 of these two values.

It is noted that the choice of the functions F1 and F2 may impact both the complexity of the statistical processing of the table CH to be performed to determine the considered part of the secret data, and the success of the statistical processing to determine the value of the part of the secret data being searched for.

The part of the secret data being searched for by executing steps S1 to S19 may, for example, be defined on 8 or 16 bits. In the case of 8 bits, the index g is successively allocated to all the values between 0 and 255 (or 1 and 256=2$^8$). It is noted that the order in which the values of g are tested is not significant for the result of the test. The part of the secret data being searched for may also be defined on wider words such as on 16, 32 or 64 bits.

Another part of the secret data SD may be determined by executing steps S9 to S19 using the values of the previously determined parts of the secret data, and by forcing another part of the secret data to the different possible values of the index g. For this purpose, the same parts ECi of the traces Ci or other parts of these traces can be extracted in step S4.

It is noted that the value sets forming the traces Ci may have been collected (steps S2 and S3) before executing the other steps in FIG. 4. In addition, a table HT may have been constituted for each of the traces Ci, before executing steps S9 to S19.

The operation OPR/OPRK applied to the secret data SD and to the input data M[i] may be one or a combination of the following operations:
a symmetrical or asymmetrical ciphering or deciphering operation, the secret data SD being the encryption or decryption key
a signature operation using the secret data SD,
a modular or non-modular multiplication by the secret data (M[i]×SD),
an XOR logic operation (Exclusive OR) with the secret data (M[i] XOR SD),
a modular exponentiation operation, the secret data SD being used as exponent (M[i]SD mod n, n being known),
a modular reduction operation, the secret data SD being used as modulus (M[i] mod SD),
a substitution operation by a value selected in a substitution table using the input data (SBOX[M[i]], SBOX being the substitution table), and
an operation combining an XOR logic operation applied to the secret data and the substitution operation replacing the result of the logic operation with a value selected in a substitution table using the result of the XOR operation (SBOX[M[i] XOR SD]).

More generally, this operation must enable a part of the final value of the operation to be computed based solely on a part of the secret data and an input data.

Figure 7:
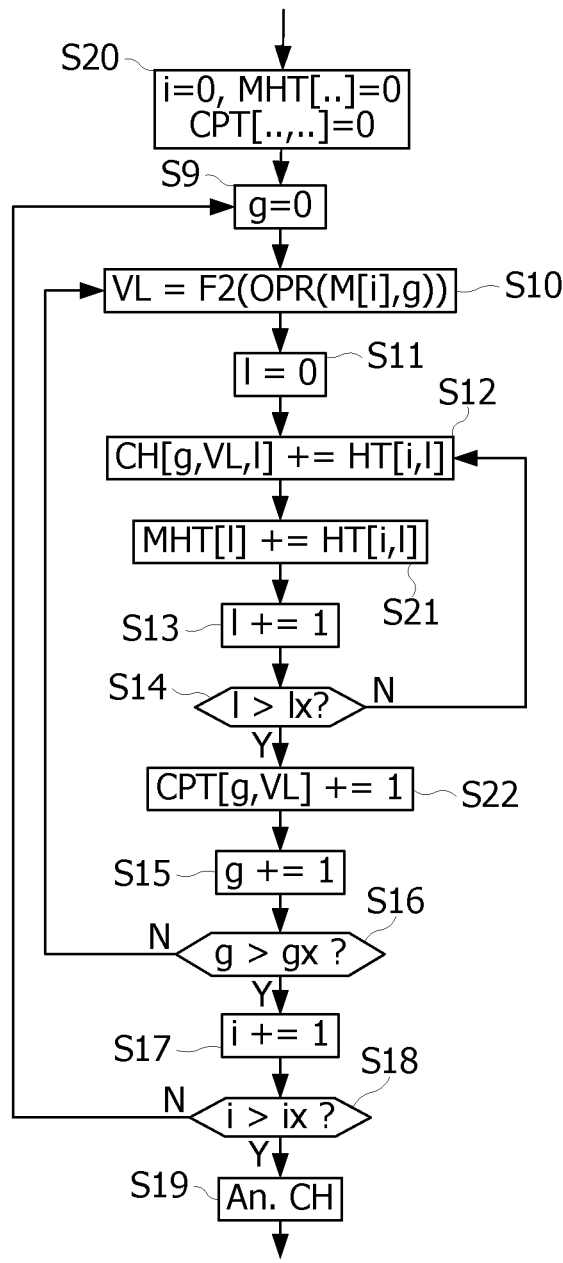
FIG. 7 illustrates a method for testing a secure circuit, according to another embodiment.

To highlight the accumulated values corresponding to the information about the secret data, the contents of all the tables HT can be added to each other to obtain a table of cumulative occurrence numbers for each possible value returned by the function F1. The values of this table of cumulative totals are subtracted from all the tables accumulated in the locations of the table CH[g,VL]. Therefore, the sequence of steps in FIG. 4 may be modified in accordance with the sequence illustrated in FIG. 7. The steps (operations, functions, processes, etc.) shown in FIG. 7 include the steps S9 to S19 described above, and additional steps S20, S21 and S22. In step S20, which is carried out before step S9, index i, a one-dimensional table MHT and a two-dimensional table CPT are set to 0. In step S9, a two-dimensional table HT[0 . . . ix,l] has been previously filled in to contain all the tables generated in step S6 for all the traces Ci. Step S21 is inserted into the loop (between steps S12 and S14) controlled by the index l whereby it is possible to select one of the values provided by the function F1, for example after step S12. In step S21, the processing unit PC accumulates each value HT[i,l] in a table of cumulative totals MHT at a location designated by the index l. In this way, at the end of the processing, the table MHT will contain the sum of all the values HT[i,l] of index i obtained for each of the traces Ci. Step S22 is executed once upon each iteration of the loop controlled by the index i, where it is possible to select one of the traces Ci, for example after step S14. Step S22 enables the number of tables HT[i,l] accumulated in each location CH[g,VL] of the table CH to be counted. The result of this counting is stored in a table CPT.

Figure 8:
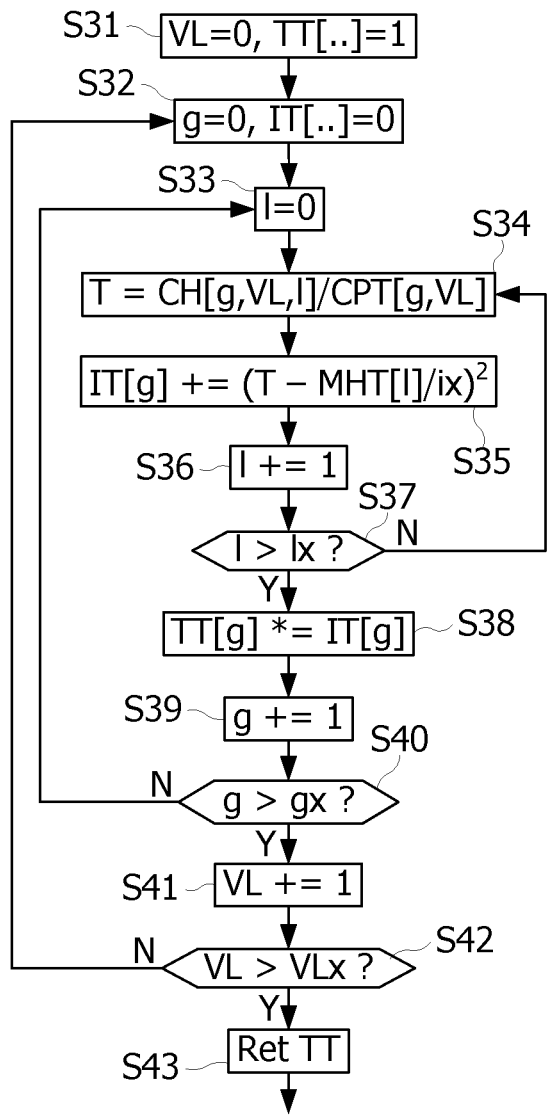
FIGS. 8 and 9 illustrate methods for statistically analyzing a value set obtained by the test method, according to various embodiments.

FIG. 8 illustrates steps (operations, functions, processes, etc.) S31 to S43 of an example of statistical processing of the table CH to attempt to determine the value of the part of the secret data SD searched for. Steps S31 to S37 are successively executed. In step S31, the index VL is set to 0 and all the locations of a table TT are set to 1. In step S32, the index g and all the locations of a table IT are set to 0. In step S33, the index l is set to 0. In step S34, a variable T receives the value CH[g,VL,l] contained in the table CH, selected by the indices g, VL, and l, this value being divided by the counting value located at the location CPT[g,VL] in the table CPT. In step S35, the value IT[g] at the location g in the table IT is incremented by the squared result of the division by the total number ix of traces Ci, of the difference between the value of the variable T and the value MHT[l] stored in the table MHT, designated by the index l. In step S36, the index l is incremented by one (1). In step S37, the index l is compared with its maximum value lx. If the index l has reached its maximum value lx, steps S38 to S40 are executed, otherwise a new iteration from step S34 is executed.

In step S38, the value TT[g] designated by the index g in the table TT is updated by being multiplied by the value IT[g] computed in steps S35 to S37, executed lx times. In step S39, the index g is incremented by one (1). In step S40, the index g is compared with its maximum value gx. If the index g is greater than its maximum value gx, steps S41 and S42 are executed, otherwise a new iteration from step S33 is executed. In step S41, the index VL is incremented by one (1). In step S42, the index VL is compared with its maximum value VLx. If the index VL is greater than its maximum value VLx, step S43 is executed, otherwise a new iteration from step S32 is executed. In step S43, the table TT is returned as result of the statistical analysis.

Therefore, upon the last iteration of the processing loop including steps S32 to S42, the tables IT and TT contain the following values:

$$IT[g, VL] = \sum_{l=0}^{lx} \left[ \frac{CH[g, VL, l]}{CPT[g, VL]} - \frac{MHT[l]}{ix} \right]^2 \quad (2)$$

$$TT[g] = \prod_{VL=0}^{VLx} IT[g, VL] \quad (3)$$

with $CPT[g, VL] = \sum_{i=0}^{ix} (F2(OPR(M[i], g)) = VL)$, and $MHT[l] = \sum_{g=0}^{gx} \left[ \sum_{VL=0}^{VLx} CH[g, VL, l] \right]$, where the operator "==" represents the equality test (equal to 1 when the equality is true, and to 0 when the equality is false), the table IT being set to 0 in step S32 and loaded in step S35 for each new value of the index VL.

Therefore, CPT[g,VL] represents the number of times the condition (F2(OPR(M[i],g))==VL) is true. If the secret data SD leaked when executing the operation OPRK, a location of the table TT contains a much higher value than the other values stored in this table. The result is that the part of the secret data SD searched for is equal to the index g of the highest value in the table TT.

It is noted that the values of the table IT can be added rather than being multiplied in step S38 corresponding to the equation (3). The implementation of a multiplication operation merely enables the differences between the values of the table TT to be increased, and thus the highest value corresponding to the part of the secret data being searched for to be better highlighted. It is also possible to consider applying the logarithm function to the values of the table IT and performing an additive accumulation of the logarithm values obtained, in the table TT. When the values of the tables IT are added, they can be weighted as follows:

$$TT[g] = \frac{1}{ix} \sum_{VL=0}^{VLx} CPT[g, VL] \cdot IT[g, VL]. \quad (4)$$

Figure 9:
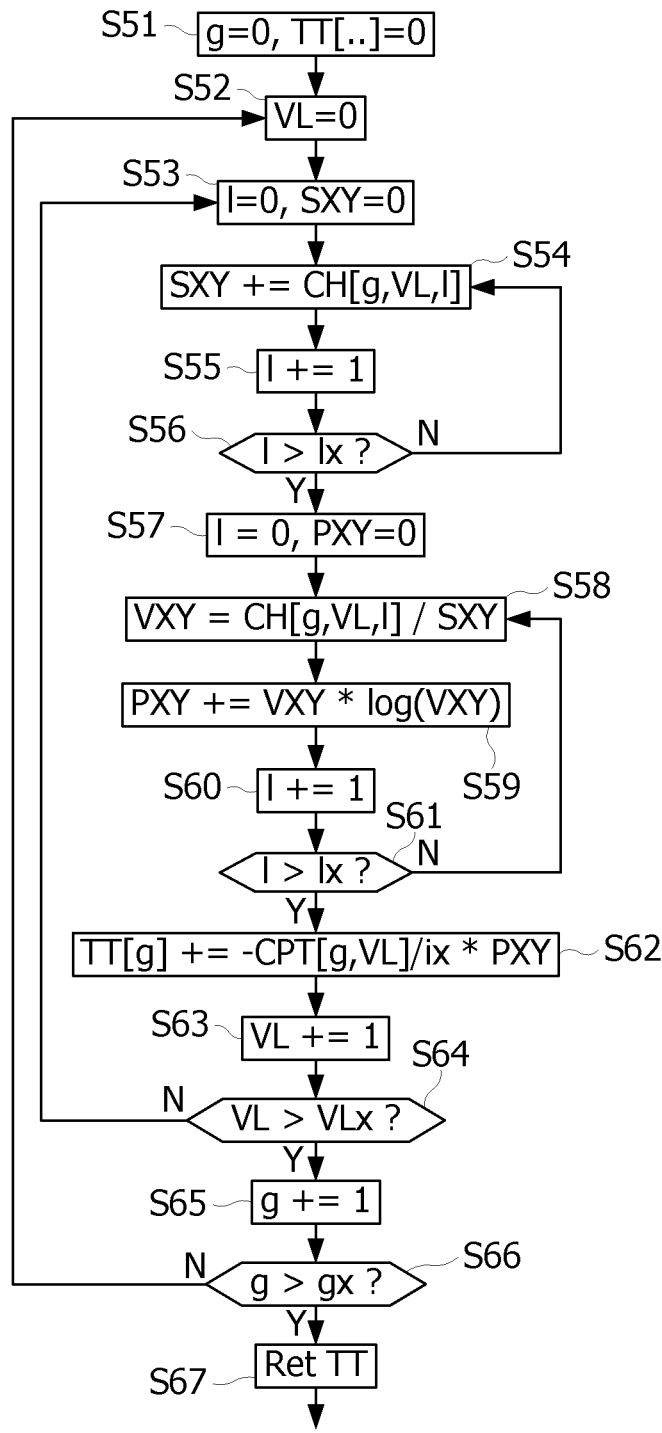

FIG. 9 illustrates steps (operations, functions, processes, etc.) S51 to S67 of another example of statistical processing of the table CH to attempt to determine the value of a part of the secret data SD being searched for. This processing is based on the Shannon entropy function. Steps S51 to S56 are successively executed. In step S51, the index g is set to 0 and all the locations of the table TT are set to 0. In step S52, the index VL is set to 0. In step S53, the index l and a variable SXY are set to 0. In step S54, the variable SXY is incremented by the value CH[g,VL,l] selected in the table CH, by the indices g, VL, and l. In step S55, the index l is incremented by one (1). In step S56, the index l is compared with its maximum value lx. If the index l has reached its maximum value lx, steps S57 to S61 are executed, otherwise a new iteration is executed from step S54 to step S56. In step S57, the index l and a variable PXY are set to 0. In step S58, a variable VXY receives the value CH[g,VL,l] selected in the table CH by the indices g, VL, and l, this value being divided by the variable SYX computed by iterations from step S54 to S56. In step S59, the variable PXY is incremented by the product of the variable VXY by the logarithm (for example in base 2) of the variable VXY. In step S60, the index l is incremented by one (1). In step S61, the index l is compared with its maximum value lx. If the index l has reached its maximum value lx, steps S62 to S64 are executed, otherwise a new iteration is executed from step S58 to step S61.

In step S62, the value TT[g] designated by the index g in the table TT is updated by subtracting from it the product of the value CPT[g,VL] divided by the number ix of traces Ci, by the variable PXY, the value CPT[g,VL] being designated by the indices g and VL in the table CPT filled in step S22. In step S63, the index VL is incremented by one (1). In step S64, the index VL is compared with its maximum value VLx. If the index VL is greater than its maximum value VLx, steps S65 and S66 are executed, otherwise a new iteration from step S53 is executed. In step S65, the index g is incremented by one (1). In step S66, the index g is compared with its maximum value gx. If the index g is greater than its maximum value gx, step S67 is executed, otherwise a new iteration from step S52 is executed. In step S67, the table TT is returned as result of the statistical analysis.

Therefore, upon the last iteration, after step S66, the table TT contains the following values:

$$TT[g] = -\sum_{VL=0}^{VLx} \left[ \frac{CPT[g, VL]}{ix} \cdot \sum_{l=0}^{lx} \frac{CH[g, VL, l]}{SXY} \cdot \log\left(\frac{CH[g, VL, l]}{SXY}\right) \right] \quad (5)$$

$$\text{where } SXY = \sum_{l=0}^{lx} CH[g, VL, l]$$

is computed for each of the values of the indices g and VL, and each value of the index g represents a possible value of the part of the key searched for. If the secret data SD leaked when processing the operation OPRK, a location of the table TT contains a much higher value than the other values stored in this table. The result is that the part of the secret data SD searched for is equal to the index g of the highest value in the table TT.

Figure 10:
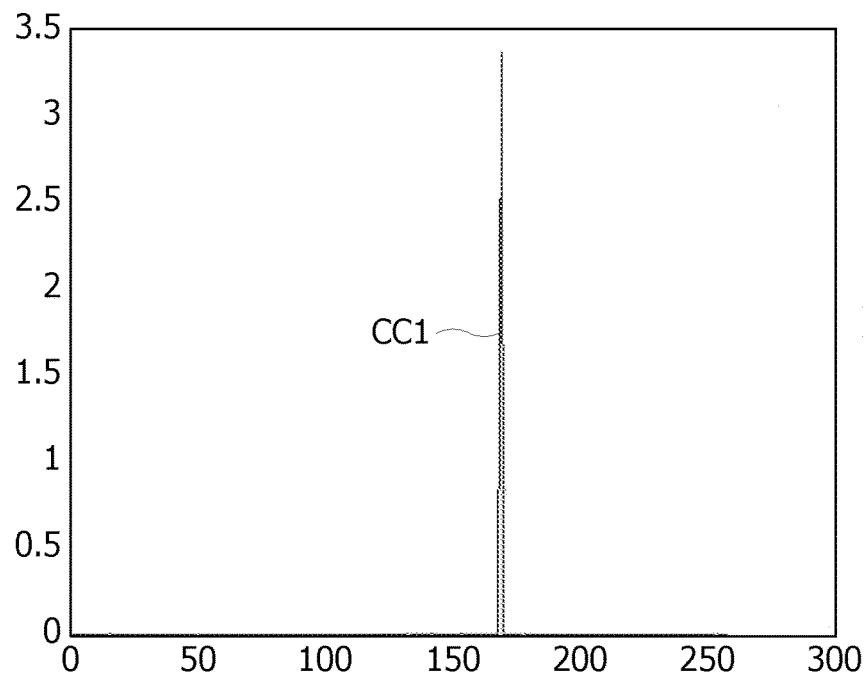
FIGS. 10 and 11 illustrate, in the form of curves, result tables provided by the analysis methods of FIGS. 8 and 9, FIGS. 12 and 13 illustrate, respectively, a first mode of protecting a data, and an operation concerning data protected according to this first protection mode.
Figure 11:
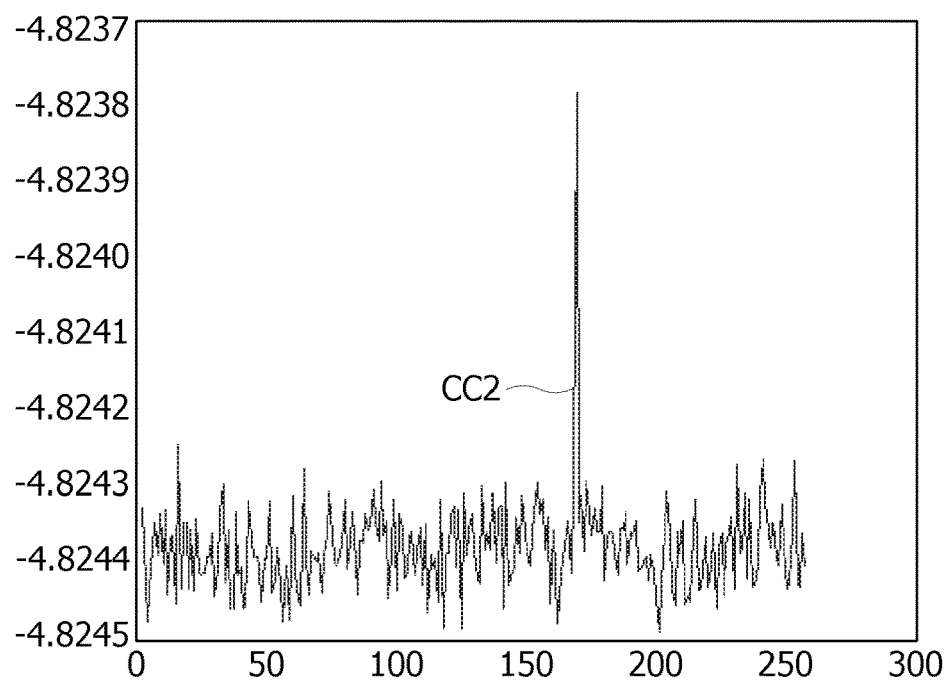

FIGS. 10 and 11 illustrate, in the form of curves CC1, CC2, an example of content of the table TT as a function of the index g. The curve CC1 was obtained by executing the steps in FIG. 8, and the curve CC2 was obtained by executing the steps in FIG. 9. In the example of FIGS. 10 and 11, the index g has a length of one byte (thus varying from 0 to 255), and curves CC1 and CC2 have been obtained from a number of traces Ci of the order of 500,000. Curves CC1 and CC2 have a clear peak at the value g=168 compared to the other values contained in the table TT. The value of the peak in the curve CC1 is greater than about thirty times the other values of the table TT. In the curve CC2, the value of the peak is greater than three times the other values of the table TT.

Effectiveness of conventional counter-measures in relation to disclosed test methods So that circuits, such as integrated circuits, as described herein can successfully pass known qualification or certification procedures, the designers of these circuits provide counter-measures the most conventional of which involve introducing a time variable. This arrangement can be made by causing the duration of the clock cycle supplied to the circuit to vary randomly, or by introducing dummy processing cycles or operations at times chosen randomly. The calculation of the values in the tables HT enables the time aspect to be removed from the analyzed values, and avoids having to synchronize the different traces of the analyzed values. Provided that information concerning the secret data being searched for is in the analyzed data, the test method previously described may enable all or part of the secret data to be determined.

Appropriate Counter-Measures

Some embodiments described herein relate to counter-measures that can be implemented and can enable a circuit to be considered capable of being used (securely used), after testing with a qualification or certification test including the test method previously described.

In certain implementation, circuits (secure circuits) can be configured to protect an encryption operation (performed by the circuit) against an analysis implemented by the test methods previously described. In this context, the operation receives one or more input data, and provides an output data according to the value of the input data. A counter-measure, according to one embodiment, can include representing sensitive data in a format including one or more data words, each data word including a respective part of the sensitive data and the binary one's complement of the respective part, a considered part possibly including the entire data. Each word containing a part of the (sensitive) data may include additional bits that can be set to random values. Furthermore, the operation can be modified so as to take account of the format(s) of the input data of the operation and to provide an output data in a same format or a format similar to that of the input data. It is noted that the different input data for a given operation may have different formats, provided that the operation is configured to take (accept, process, and so forth) these different formats.

Due to the fact that the data to be protected can be represented in the form of multiple data words, each data word that includes a part of the (sensitive) data and the corresponding binary one's complement of each part, the Hamming weight of each word representing the data does not depend on the value of the data or part of the data in the each word. Therefore, it is not possible to find the value of the data or part of the data through a statistical analysis if the leakage pattern of the circuit corresponds to the Hamming weight.

Figure 12:
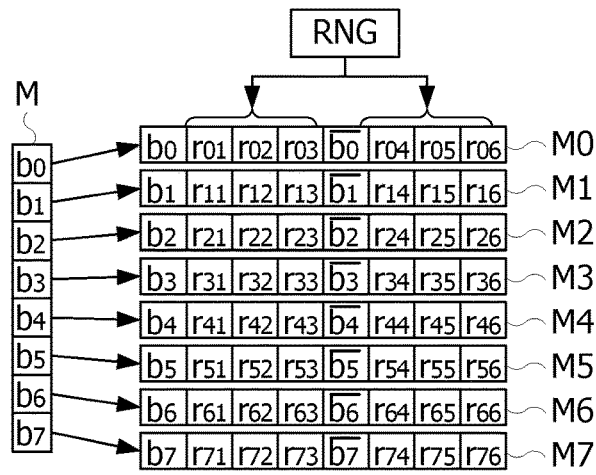

FIG. 12 illustrates a data M that may be a secret data and/or an input data M of an operation that may be part of an encryption calculation. In the example of FIG. 12, the data M is in the form of a byte consisting of eight bits b0 to b7. According to one embodiment, the data M is represented in the form of 8 words M0 to M7 of eight bits, for example, each word including a respective bit from bits b0-b7 of the data M, SD, and the binary one's complement of this bit. Therefore, each word Mj includes the bits bj and $\overline{bj}$, j representing the rank of the bit bj in the data M. According to one embodiment, the other bits of the words Mj have randomly chosen values rj1 to rj6, for example provided by a random number generator RNG. The bits bj and $\overline{bj}$ can be placed in other positions of the word Mj. In the example of FIG. 12, each word Mj has the following form:

$$bj\text{-}rj1\text{-}rj2\text{-}rj3\text{-}\overline{bj}\text{-}rj4\text{-}rj5\text{-}rj6, \quad (6)$$

with the bit bj at the first rank and the bit $\overline{bj}$ at the fifth rank.

Figure 13:
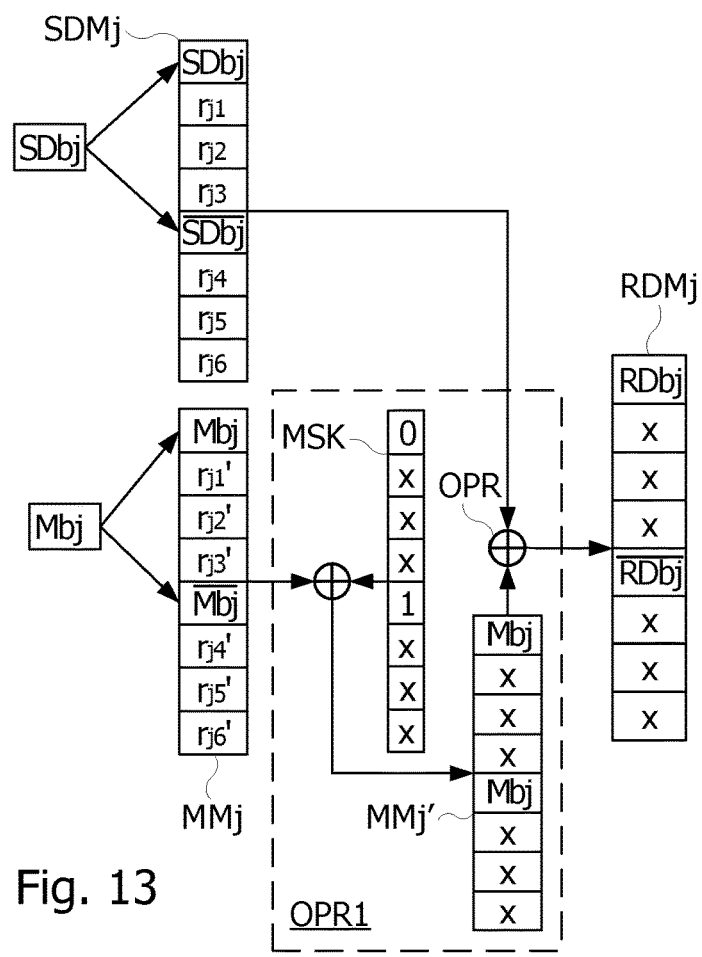

FIG. 13 illustrates an operation OPR combining a bit Mbj of the input data M with a bit SDbj of a secret data SD and providing a bit RDbj of an output data RD, j corresponding to the rank of the bit bj processed in the input data M, SD. The bits Mbj and SDbj are respectively inserted into words MMj and SDMj, in accordance with the example shown by FIG. 12. Therefore, the word MMj includes the bit MBj and its binary one's complement $\overline{Mbj}$. Similarly, the word SDj includes the bit SDbj and its binary one's complement $\overline{SDbj}$.

According to one embodiment, the operation OPR applied to each bit of the input data and of the secret data can be replaced with an operation OPR1 receiving at input the words MMj and SDMj, and providing an output word RDMj. The operation OPR1 includes an operation of partially complementing bits of the input word MMj, and providing a modified input word MMj'. The operation OPR1 applies the operation OPR to the words SDMj and MMj', and the latter operation provides the output word RDMj including a bit RDbj and its binary one's complement $\overline{RDbj}$.

In the event that the operation OPR is an Exclusive OR logic operation, the partial complementation operation includes, for example, an Exclusive OR logic operation combining the input word MMj with a mask MSK, the latter including a bit on 0 at the rank of the bit Mbj in the word MMj, a bit on 1 at the rank of the bit $\overline{Mbj}$, and bits of any values "x" at the other ranks of the mask. In this way, the bit $\overline{M}bj$ in the word MMj is one's complemented by the application of the mask MSK to obtain the bit Mbj in the word MMj'. The result is that the bit RDbj in the output word RDMj is equal to SDbj XOR Mbj, XOR representing the Exclusive OR logic operation, and the bit $\overline{RDbj}$ is equal to $\overline{SDbj}$ XOR Mbj, this value being effectively equal to the one's complement of SDbj XOR Mbj. It is noted that any leakage risk due to the presence of twice the bit Mbj in the word MMj' has no importance if the data M needs no protection.

The ranks in the words SDMj and MMj of the bits SDbj, $\overline{SDbj}$ and Mbj, $\overline{Mbj}$ are identical, but can be of any value, and may thus be chosen randomly. They may also differ according to the index j. It is merely important that the circuit executing the operation OPR1 know the locations of these bits.

Figure 14:
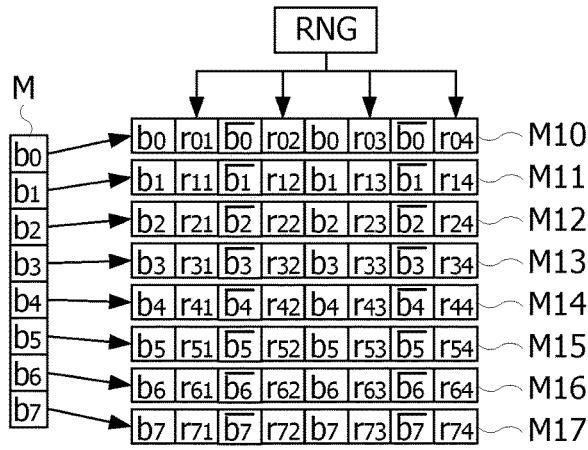
FIGS. 14 and 15 illustrate, respectively, a second mode of protecting a data, and an operation involving data protected according to this second protection mode.

FIG. 14 illustrates a data M that can be a secret data SD and/or an input data M of an operation that can belong to an encryption calculation. In the example in FIG. 14, the data M is in the form of a byte consisting of (including, having, etc.) the bits b0 to b7. According to one embodiment, the data M is represented in the form of 8 words M10 to M17 of one byte each including two occurrences of a respective bit b0-b7 of the data M, and two occurrences of the binary one's complement of this bit. Therefore, each word M1$j$ includes two each of the bits bj and $\overline{bj}$, j being equal to the rank of the bit bj in the data M. According to one embodiment, the other bits of the words M1$j$ can receive random values rj1 to rj4, for example, provided by a random number generator RNG. The two occurrences of each of the bits bj and $\overline{bj}$ can be placed in any other position in the word M1$j$. In the example of FIG. 14, each word M1$j$ has the following form:

$$bj\text{-}rj1\text{-}\overline{bj}\text{-}rj2\text{-}bj\text{-}rj3\text{-}\overline{bj}\text{-}rj4, \quad (7)$$

with the bit bj at the first and fifth ranks and the bit $\overline{bj}$ at the third and seventh ranks in the word M1$j$.

Figure 15:
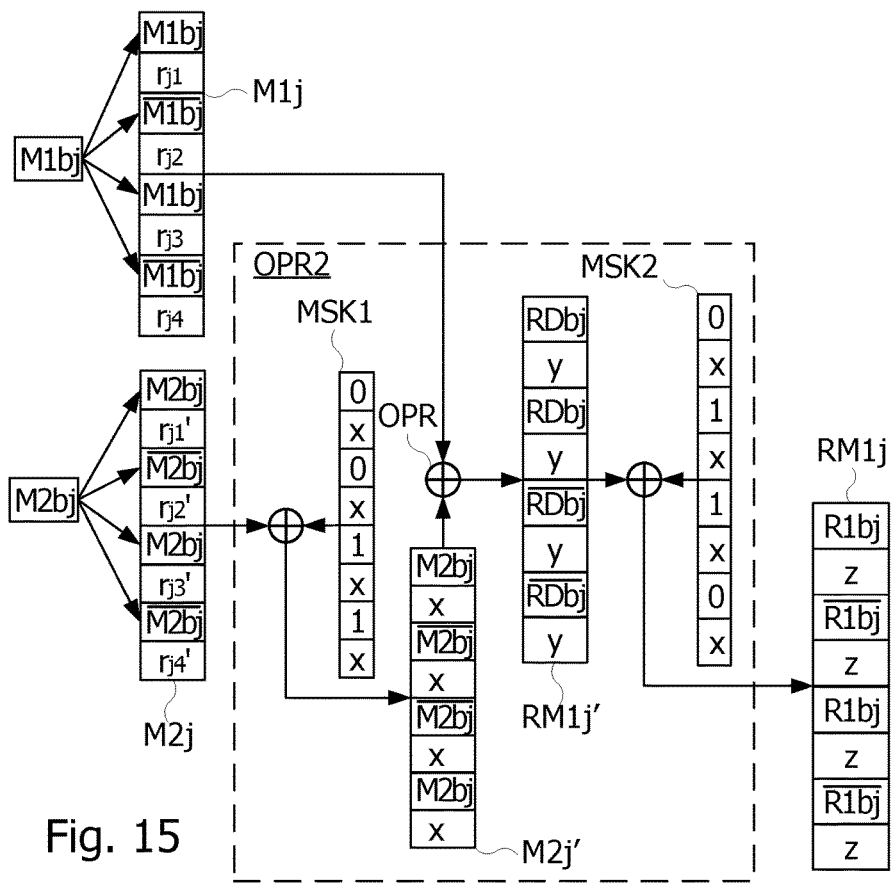

FIG. 15 illustrates an operation OPR combining a bit M1$bj$ of an input data M1 with a bit M2$bj$ of another data M2 and providing a bit RDbj of an output data RD. The bits M1$bj$ and M2$bj$ are respectively inserted into words M1$j$ and M2$j$, in accordance with the example shown by FIG. 14. Therefore, the word M1$j$ includes two occurrences of the bit M1$bj$ and two occurrences of the binary one's complement $\overline{M1bj}$ of this bit. Similarly, the word M2$j$ includes two occurrences of the bit M2$bj$ and two occurrences of the binary one's complement $\overline{M2bj}$ of this bit.

According to one embodiment, the operation OPR applied to each bit of the input data M1, M2, is replaced with an operation OPR2 receiving at input the words M1$j$ and M2$j$, and providing an output word RM1$j$. The operation OPR2 includes a first operation of partially complementing bits of the input word M2$j$, and providing a modified input word M2$j'$. The operation OPR2 applies the operation OPR to the words M1$j$ and M2$j'$, which provides a resulting word RM1$j'$ including two occurrences of a bit R1$bj$ and two occurrences of the binary one's complement $\overline{R1bj}$ of this bit. The output word RM1$j$ of the operation OPR2 is obtained following a second operation of partially complementing bits of the resulting word RM1$j'$.

In the event that the operation OPR is an Exclusive OR logic operation, the first partial complementation operation includes, for example, an Exclusive OR logic operation combining the input word M2$j$ with a mask MSK1, the latter including a bit on 0 at the ranks of the first occurrences of the bits M2$bj$ and $\overline{M2bj}$ in the word M2$j$, a bit on 1 at the ranks of the second occurrences of the bits M2$bj$ and $\overline{M2bj}$ and bits of any values "x" at the other ranks of the mask. In this way, the two second occurrences of the bits M2$bj$ and $\overline{M2bj}$ in the word M2$j$ are one's complemented by the application of the mask MSK1. It is noted that following the first partial complementation operation, the occurrence numbers of bits M2$bj$ remain equal to the occurrence numbers of the bits $\overline{M2bj}$. The result is that the Hamming weight of the word M2$j$ or M2$j'$ does not depend on the value of the bit M2$bj$. The resulting word RM1$j'$ successively includes two occurrences of the bit R1$bj$, then two occurrences of the bit $\overline{R1bj}$. Indeed, if the bit R1$bj$ is equal to the result of the operation M1$bj$ XOR M2$bj$, the second bit R1$bj$ in the word RM1$j'$ does result from the operation $\overline{M1bj}$ XOR $\overline{M2bj}$, the first bit $\overline{R1bj}$ does result from the operation M1$bj$ XOR $\overline{M2bj}$, and the second bit $\overline{R1bj}$ does result from the operation $\overline{M1bj}$ XOR M2$bj$. The second partial complementation operation results in an output word RM1$j$ having a same format as the input words M1$j$ and M2$j$ to be obtained. The second partial complementation operation includes, for example, an Exclusive OR logic operation combining the resulting word RM1$j'$ with a mask MSK2, the latter including bits of 0 and 1, respectively, at the ranks of the first and second occurrences of the bit R1$bj$, and bits of 1 and 0, respectively, at the ranks of the first and second occurrences of the bit $\overline{R1bj}$, and bits of any values "x" at the other ranks of the mask. In this way, the second occurrence of the bit R1$bj$ and the first occurrence of the bit $\overline{R1bj}$ in the word RM1$j'$ are one's complemented by the application of the mask MSK2. The result is that the output word RM1$j$ has the same format as the input data M and the secret data SD. The bit R1$bj$ in the output word RM1$j$ is equal to M1$bj$ XOR M2$bj$, and the bit $\overline{R1bj}$ is equal to $\overline{M1bj}$ XOR M2$bj$, this value being effectively equal to the one's complement of M1$bj$ XOR M2$bj$.

It can be seen in FIG. 15, that all the words handled include as many one's complemented input bits M1$bj$, M2$bj$ or output data R1$bj$, as corresponding bits that are not one's complemented. It is noted that the final partial complementing operation applying the mask MSK2 merely aims to put the output word RM1$j$ to the same format as the input words M1$j$, M2$j$. This partial complementation operation can, therefore, be omitted if the next operation applied to the output word RM1$j$ takes the format of the intermediate result word RM1$j'$ into account.

Figure 16:
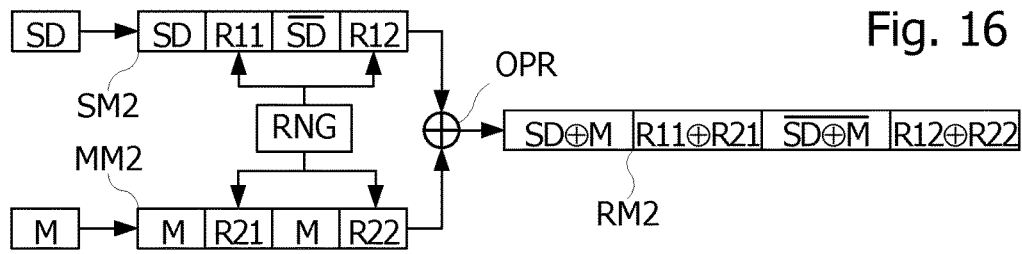
FIGS. 16 and 17 illustrate, respectively, a third mode of protecting a data, and an operation involving data protected according to this third protection mode, FIG. 18 schematically illustrates a circuit performing an operation modified to process protected data, according to one embodiment, FIG. 19 schematically illustrates a calculation circuit for calculating an index of the modified operation of FIG. 18, according to one embodiment.

FIG. 16 illustrates another word format in which data to be protected can be represented, according to one embodiment. In FIG. 16, a secret data SD and its binary one's complement $\overline{SD}$ are entirely inserted into a bigger word SM2, which can also include random values R11, R12, for example generated by a random number generating circuit RNG. The input data M is also inserted into a word MM2 having the same format as the word SM2, with the input data M, its binary one's complement $\overline{M}$, and random values R21, R22. As an example, each of the data SD and M include 8 bits and the words SM2 and MM2 include 32 bits.

FIG. 16 also illustrates the operation OPR applied to the words MM2 and SD2 to provide an output word RM2. In the example of FIG. 16, this operation is an Exclusive OR operation. For the format of the output word RM2 to be the same as that of the secret data SD and not to cause leakages susceptible of being statistically analyzed, the input word MM2 can undergo a partial complementation operation that complements, to one, the part of the word MM2 containing the one's complement $\overline{M}$ of the input data M, and does not change the part of the word MM2 containing the data M. Therefore, the output word RM2 in this example has the following form:

$RM2 = SD \oplus M // R11 \oplus R21 // \overline{SD \oplus M} // R12 \oplus R22$ the symbol "⊕" representing the Exclusive OR operator and the symbol "//" representing the bit string concatenation operator.

Figure 17:
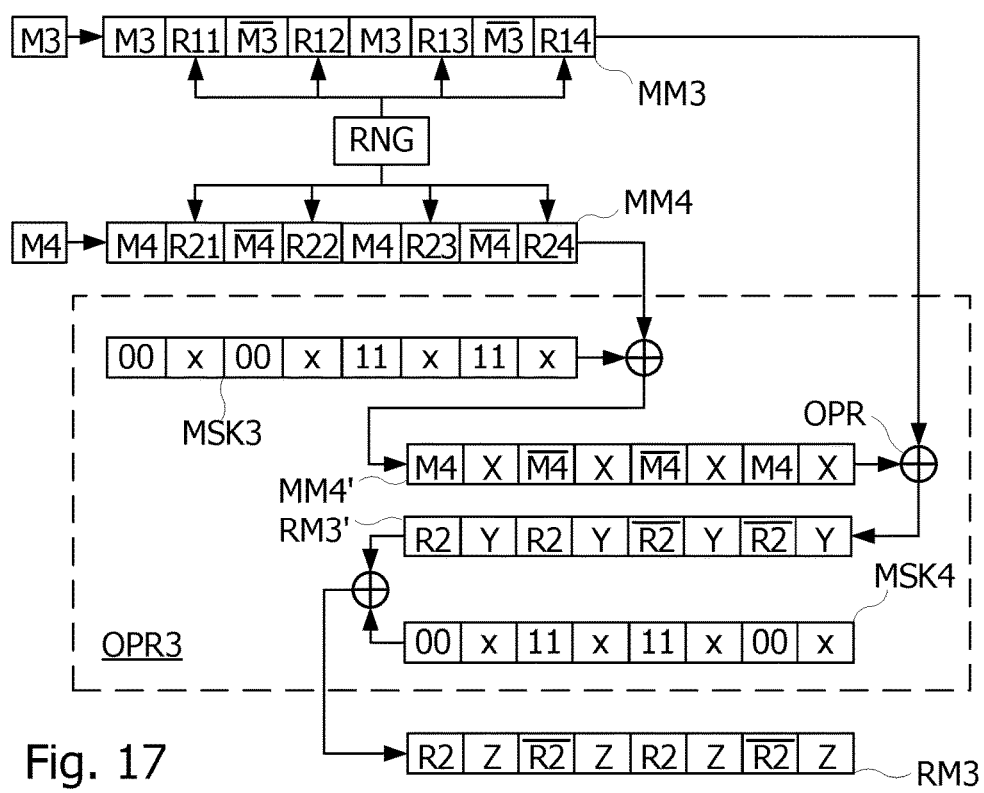

FIG. 17 illustrates another word format in which data to be protected can be represented, according to one embodiment. In FIG. 17, data M3, M4, and their respective binary one's complements $\overline{M3}$, $\overline{M4}$, are entirely inserted twice into a bigger word MM3, MM4, which can also include random values R11, R12, R13, R14, R21, R22, R23, R24, for example, generated by a random number generating circuit RNG. For example, each of the data M3 and M4 include 4 bits and the words MM3 and MM4 include 32 bits. It is noted that this format can be used for data M3, M4 including 8 bits, by using two words in this format, each of these words including 4 bits of the data M3, M4.

FIG. 17 also illustrates an operation OPR3 including the operation OPR to be performed on (applied to) the words MM3 and MM4 to produce an output word RM3. In the example of FIG. 17, this operation performs an Exclusive OR operation on the data M3, M4. The operation OPR3 includes a partial complementation operation combining a mask MSK3 with one of the words MM3, MM4 (MM4 in the example of FIG. 17). This complementation operation can be performed to complement the second occurrence of the data M4 and the second occurrence of the complemented data $\overline{M4}$, present in the word MM4. For this purpose, the partial complementation operation combines the word MM4 by an Exclusive OR operation with the mask MSK3, which includes bits of 0 at ranks corresponding to the ranks of the bits of the first occurrences of the data M4 and of its complement $\overline{M4}$, to be kept, and bits of 1 at ranks corresponding to the ranks of the bits of the second occurrences of the data M4 and of its complement $\overline{M4}$ to be complemented. The complementation operation results in a word MM4' that is combined by the operation OPR with the word MM3. The operation OPR provides an intermediate result word RM3'. If the operation OPR is an Exclusive OR operation, the word RM3' successively includes two occurrences of the output data R2 ($=\overline{M3 \oplus M4}$ or $\overline{M3} \oplus \overline{M4}$), followed by two occurrences of the one's complemented output data $\overline{R2}$ ($=\overline{M3} \oplus M4$ or $M3 \oplus \overline{M4}$). The operation OPR3 may include a final partial complementation operation applying a mask MSK4 to the intermediate result word RM3'. This complementation operation results in an output word RM3 being obtained in a same format as the secret data word SM3. For this purpose, the complementation operation can be an Exclusive OR operation combining the word RM3' with a mask MSK4 including bits of 0 at ranks corresponding to the bits of the data not to be complemented in the word RM3' and bits of 1 at ranks corresponding to the bits of the data to be complemented in the word RM3'. To change from the word RM3' to the output word RM3, it can be sufficient to complement, in the word RM3', the second occurrence of the output data R2 and the first occurrence of the complemented output data $\overline{R2}$. It can be seen, in FIG. 17, that all the words manipulated by the operation OPR3, e.g., the input words MM3, MM4, the output word RM3 and the intermediate result word RM3', have two occurrences of a same data and two occurrences of this one's complemented data.

It is noted that the first partial complementation operation may not be necessary if the input word MM4 is provided at input of the operation OPR3 in the same format as the word MM4'. Furthermore, the final complementation operation providing the output word RM3 may not be necessary if the operation that uses the output word is configured to process words having the format of the intermediate result word RM3'.

Figure 18:
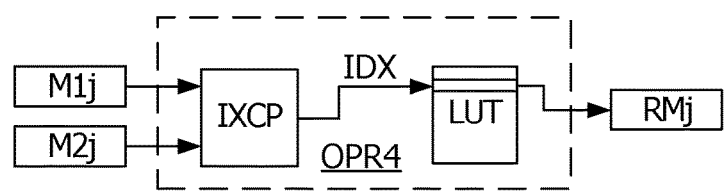

FIG. 18 illustrates a circuit OPR4 performing an operation to be protected, according to one embodiment. This circuit is configured to receive input data bits represented in the form of words M1j, M2j having a format similar to those previously described with reference to FIGS. 12 and 14. In these Figures, each bit of the input data is represented in the form of a word M1-M7, M11-M17. Thus, in FIG. 12, each of these words M0 to M7 (Mj) includes an occurrence of a bit bj of the input data and an occurrence of the binary one's complement of this bit. In FIG. 14, each of these words M11 to M17 (M1j) includes two occurrences of a bit bj of the input data and two occurrences of the binary one's complement of this bit. According to one embodiment, the circuit OPR4 includes a calculation circuit IXCP configured to calculate an index word IDX using the input words M1j, M2j. The circuit OPR4 also includes a table LUT that provides an output word RMj of the circuit OPR4 according to the value of the index word IDX. The output word can have a format similar to the format of the input words, or even a format expected by a next operation using the output words RMj.

Figure 19:
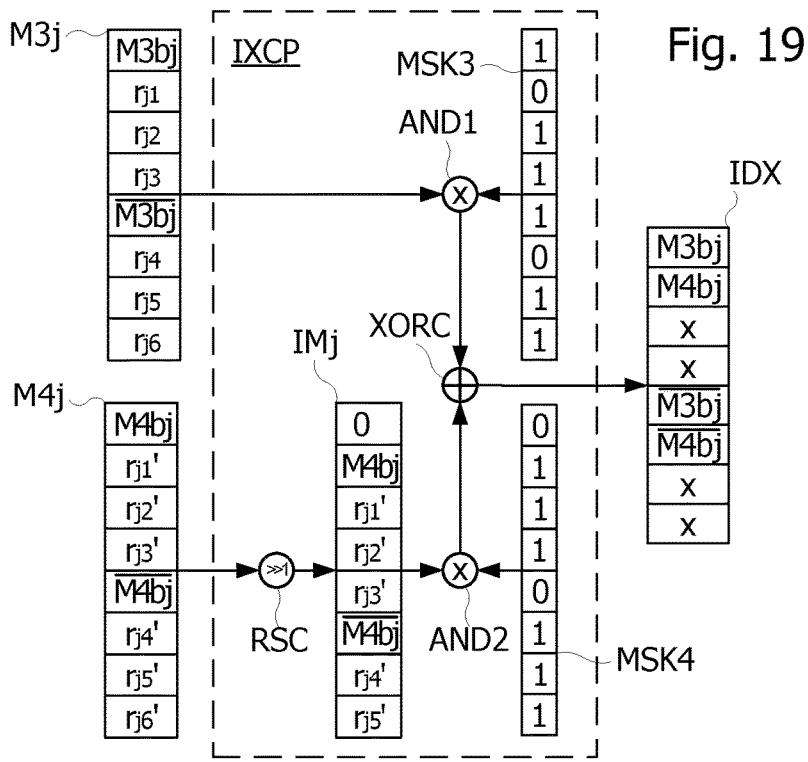

FIG. 19 illustrates an example of the index calculation circuit IXCP when the input words M1j, M2j have the format represented in FIG. 12. Therefore, each of the words M1j and M2j includes, respectively at the first rank, a bit M1bj, M2bj, and at the fourth rank a bit $\overline{M1bj}$, $\overline{M2bj}$ equal to the respective binary one's complement of the bits M1bj, M2bj. The circuit IXCP includes a binary right-shift circuit RSC, receiving the input word M2j and providing a shifted word IMj including, at the first rank, a bit of 0, then at the next ranks the bits of the word M2j except for the last bit (rj6'). The circuit IXCP also includes a first logic masking circuit AND1 applying an AND logic operation to the input word M1j and to a masking word MSK3, a second logic circuit AND2 applying an AND logic masking operation to the word IMj and to a masking word MSK4, and a third logic circuit XOR applying an Exclusive OR operation to the words provided by the circuits AND1 and AND2 to provide (produce, generate, etc.) the index word IDX. The first masking operation performed by the circuit AND1 can cause the bits at the second and fifth ranks of the input word M1j to be set to 0 without changing the other bits. The second masking operation, performed by the circuit AND2, can cause the bits at the first and fourth ranks of the word IMj to be set to 0. The result of the first and second masking operations can be that the index word IDX includes the bits M1bj and M2bj at the first and second ranks, respectively, and the bits $\overline{M1bj}$ and $\overline{M2bj}$ at the fourth and fifth ranks respectively.

Figure 20:
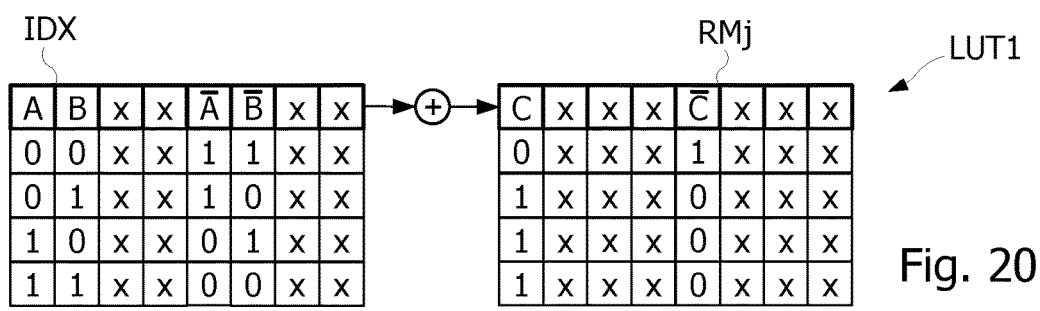
FIGS. 20 and 21 illustrate examples of contents of a table of the circuit in FIG. 18, depending on the operation to be performed, FIG. 22 schematically illustrates a calculation circuit for calculating an index of the modified operation of FIG. 18, according to another embodiment.
Figure 21:
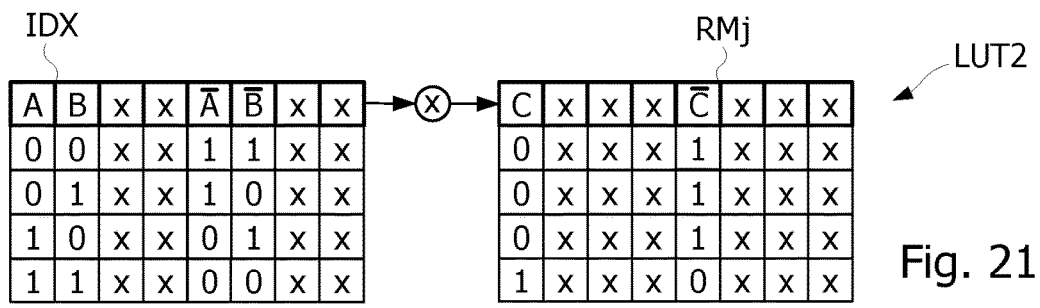

FIGS. 20 and 21 illustrate examples LUT1, LUT2 of the table LUT for performing OR and AND logic functions, respectively. The distribution of the words in the tables LUT1, LUT2 corresponds to the format of the index word "AB xx $\overline{AB}$ xx" as indicated on FIG. 19. For instance, FIG. 19 shows the index IDX with two significant data bits M3bj (=A), M4bj (=B), two random values x, the one's complement of the two data bits M3bj (=A), and M4bj (=B), and two random values x. The tables contain words in a format including a bit C of an output data and a bit $\overline{C}$ equal to the binary one's complement of this bit C.

Each of the tables LUT, LUT1, LUT2 includes 2N values, N being the number of bits of the index word IDX, e.g., 256 values in the examples of FIGS. 20 and 21. The values in the tables LUT1, LUT2 are also encoded on 8 bits. The values of the index word and of the content of the table LUT1, LUT2 are generically indicated in FIGS. 20 and 21, "x" representing a bit of any value. Tables LUT1, LUT2 reproduce the truth table of the OR and AND logic operations respectively. The bits A and B contained in the index word IDX being applied at input of the logic operation and the bit C being provided by the logic operation according to the values of the bits A and B.

Therefore, any logic operation combining two bits and producing an output bit can be performed. It is thus possible to perform other logic operations such as NAND, NOR, Exclusive OR, Exclusive NOR operations, as well as a substitution operation using a substitution table (SBOX), or a combination of these operations. Furthermore, it is noted that from a single table LUT performing a NAND operation ($\overline{AND}$), it is possible to perform any basic logic operation, by using the following equations:

$$A(AND)B=(NOT)(A(\overline{AND})B)$$

$$A(OR)B=(\overline{A}(\overline{AND})\overline{B})$$

$$A(XOR)B=(A(\overline{AND})\overline{B})(\overline{AND})(\overline{A}(\overline{AND})B)$$

It is noted that the complementation operations (NOT) applied to the bits A and B and to the result of the operation in the equations above can be performed simply by replacing each bit of the word with its one's complement, or can be omitted. Indeed, as the output word RMj includes a data bit and its one's complement, it can be considered that the output word has another format in which the ranks of the non-complemented data bits and the complemented data bits are inverted.

It is thus possible to build such a table LUT for all the possible formats of the data words. However, it is advantageous, in order to reduce the size of the table, to be able to reduce the input words M1$j$, M2$j$ into an index word of the same size as performed by the circuit IXCP in FIG. 19. This reduction operation is possible by using the bits of any value "x" if the number of these bits is greater than or equal to the number of input data bits M1$bj$, M2$bj$ of the operation, counting the one's complemented data bits $\overline{M1bj}$, $\overline{M2bj}$.

Figure 22:
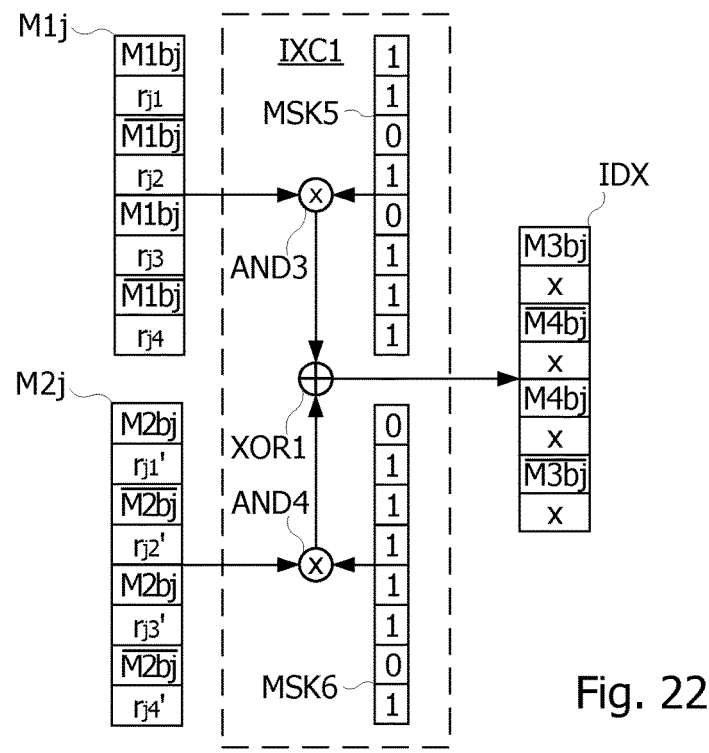

FIG. 22 illustrates another example of index calculation circuit IXC1, adapted to the format of input M3$j$, M4$j$ and output words, shown in FIG. 14, e.g., with two occurrences of a data bit and two occurrences of the binary one's complement of this bit. The circuit IXC1 includes two masking circuits AND2, AND3 and a circuit XOR1 combining the outputs of the masking circuits by an Exclusive OR operation. The masking circuit AND3 combines the input word M3$j$ with a mask MSK5 by an AND logic operation. The mask MSK5 has bits of 0 at the third and fifth ranks to set the first occurrence of the complemented bit M3$bj$ and the second occurrence of the data bit M3$bj$ present in the word M3$j$ to 0. The other bits of the mask MSK5 are 1 to keep the other bits of the word M3$j$ unchanged. The masking circuit AND4 combines the input word M4$j$ with a mask MSK6 by an AND logic operation. The mask MSK6 has bits of 0 at the first and seventh ranks to set the first occurrence of the data bit M4$bj$ and the second occurrence of the one's complemented bit $\overline{M4bj}$ present in the word M4$j$ to 0. The other bits of the mask MSK6 are 1 to keep the other bits of the word M4$j$ unchanged. Therefore, at the output of the circuit XOR1, the index word successively includes the input bit M3$bj$, the one's complemented input bit $\overline{M4bj}$ the input bit M4$bj$, then the one's complemented input bit $\overline{M3bj}$, these bits being separated by a bit of any value "x".

Figure 23:
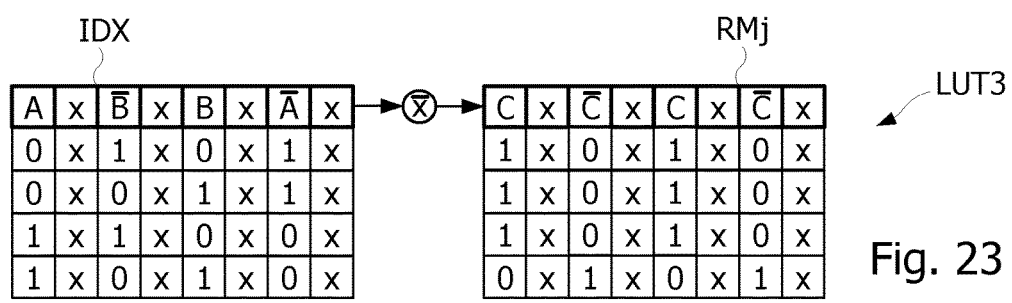
FIGS. 23 and 24 illustrate examples of contents of the table of the circuit in FIG. 18, according to other embodiments.
Figure 24:
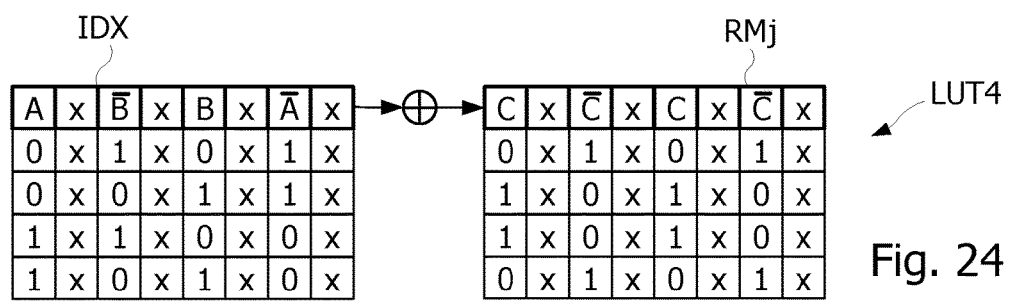

FIGS. 23, 24 illustrate examples LUT3, LUT4 of the table LUT adapted to the format of the index word IDX provided by the circuit IXC1 in FIG. 22 and to the format of the words in FIG. 14. Therefore, the index word IDX has the format "Ax$\overline{B}$x Bx$\overline{A}$x". FIG. 23 reproduces the truth table of the NAND logic operation ($\overline{AND}$), and FIG. 24 reproduces the truth table of the Exclusive OR logic operation (XOR). Therefore, tables LUT3, LUT4 contain words having two occurrences of an output bit C of the logic operation and two occurrences of this one's complemented bit: "C x $\overline{C}$ x C x $\overline{C}$ x". In FIGS. 23 and 24, the index IDX and the content of the tables LUT3, LUT4 can have 256 different values, also indicated in a generic manner, "x" representing a bit of any value.

It will be understood that the table LUT can be built according to an index word IDX including not only one bit of the input data M and one bit of the secret data SD, but several distinct bits of the input data M and as many bits of the secret data SD. Furthermore, the index word can be built simply by concatenating the input words M and SD.

According to one embodiment, the DES and AES encryption algorithms can be implemented by converting the input data and the encryption keys to one of the word representation formats described above, and using the logic operations performed in one of the approaches described with reference to FIGS. 13 and 15 to 24.

Figure 25:
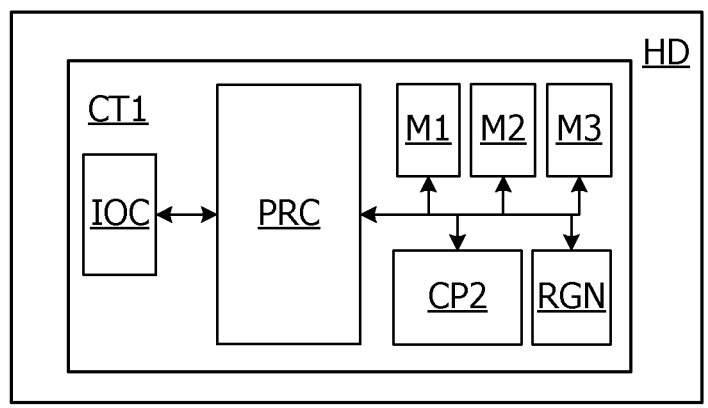
FIG. 25 illustrates a secure circuit, according to one embodiment.

FIG. 25 illustrates an integrated circuit CT1 arranged on a portable medium HD such as a plastic card, and equipped with (including, implementing, etc.) a counter-measure according to one embodiment. The integrated circuit CT1 includes the same units as the integrated circuit CT described above in connection with FIG. 1, and differs from the latter in that the coprocessor CP1 is replaced with a coprocessor CP2 implementing one of the various counter-measures described above. Therefore, according to one embodiment, the coprocessor CP2 is configured to handle the data in one or more of the formats of representation in data words described above. The conversion of the input data into one of these formats can also be performed by the coprocessor CP2, as well as the conversion of the output data. These conversions can be performed totally, or partially, by the processor PRC. In this case, the processor PRC can be matched with (correspond with, etc.) the coprocessor CP2, such that the processor PRC and the coprocessor CP2 use the same representation formats of the input and/or output data.

It will be understood that, in some embodiments, the coprocessor can be omitted and the processor PRC may perform all the operations of converting the data into data words according to a data representation format, and vice versa, and all the operations of processing the data words.

It will be understood by those skilled in the art that the embodiments described herein are given by way of example, and various alternative embodiments and various applications are possible. In particular, the disclosed embodiments are not limited to formats of operation input and/or output words including bits at random values. Thus, all the bits of a data word may come from an operation input or output data. In embodiments, such as those disclosed herein, the data word format can include one or more occurrences of data bits and as many occurrences of the binary one's complement of these bits. A data word format can be defined by a size of a part of an input data present in the data word, respective positions and a number of occurrences of this part and of its complement in the data word, random data being present in the data word, if the product of the size of the data part by the number of occurrences of this part is lower than the size of the data word. This format can also be chosen randomly. It is also possible to change the data word format upon each execution of a program implementing the operation.

Certain implementations can include combinations of the embodiments described above. For example, one of the operations OPR1, OPR2, OPR3 may be performed in a single operation with the operation OPR4, provided that the corresponding data words have compatible formats.

The circuits described above may be produced in the form of a program executable by a processor.

In a general aspect, method for executing, by a circuit, a target operation combining a first input data with a second input data, and providing an output data can include: generating at least two pairs of input words each comprising a first input word and a second input word, the first input word comprising a respective part of the first input data and a binary one's complement of the first input data part, the second input word comprising a respective part of the second input data and a binary one's complement of the second input data part, the parts of the first and second input data being in same positions in the first and second input data words of each word data pair, and the binary one's complements of the parts of the first and second input data being in same positions in the first and second input data words of each word data pair, and applying to each pair of input words a same derived operation providing an output word comprising a part of the output data, resulting from the application of the target operation to the first and second input data parts present in the pair of input words, and a binary one's complement of the output data part.

Implementations can include one or more of the following features. For example, each of the input words of each pair of input words can include a data resulting from a random or pseudo-random number generator. Each input data can be represented in the form of a word comprising several bits, each bit of each input data being inserted with its binary one's complement into a respective input word. The positions of the data part and the position of the binary one's complement of the data part in each of the words of each pair of input words and of the output word can be chosen randomly.

The derived operation can be configured to transform the first input word of each pair of input words by replacing the binary one's complement of the input data part of the first input word by the input data part, and to apply the target operation to the transformed first input word and to the second input word of the pair of input words.

Each of the input words and the output word can include two occurrences of a part of one of the two input data or of the output data, respectively, and two occurrences of the binary one's complement of the part of the input data or of the output data, respectively, the data parts being in same positions in the first and second input words of each pair of input words and in the output word. The binary one's complements of the data part can be in same positions in the first and second input words of each pair of input words and in the output word.

The derived operation can be configured to transform the first input word of each pair of input words by replacing one of the two occurrences of the input data part in the first input word by the binary one's complement of the input data part, and by replacing one of the two occurrences of the binary one's complement of the input data part in the first input word by the input data part, and to apply the target operation to the transformed first input word and to the second input word of the pair of input words.

The target operation can include one or a combination of the following operations: Exclusive OR, AND, OR, NOT AND, NOT OR, Exclusive NOT OR, and a substitution operation using a substitution table.

The derived operation can be configured to determine an index word by combining the input words of each pair of input words, and to select the output word in a table using the index word.

One of the input data can be a secret data and the other of the input data can be a data to be processed by a cryptographic operation using the secret data.

The target operation can be an operation or a combination of operations implementing the DES or AES algorithm.

In another general aspect, a circuit can include a processor and/or a coprocessor configured to: execute a target operation combining a first input data with a second input data, and providing an output data, generate at least two pairs of input words each including a first input word and a second input word, the first input word comprising a respective part of the first input data and a binary one's complement of the first input data part, the second input word comprising a respective part of the second input data and a binary one's complement of the second input data part, the parts of the first and second input data being in same positions in the first and second input data words of each word data pair, and the binary one's complements of the parts of the first and second input data being in same positions in the first and second input data words of each word data pair, and apply to each pair of input words a same derived operation providing an output word comprising a part of the output data, resulting from the application of the target operation to the first and second input data parts present in the pair of input words, and a binary one's complement of the output data part.

Implementations can include one or more of the following features. For example, each of the input words of each pair of input words can include a data resulting from a random or pseudo-random number generator. Each input data can be represented in the form of a word comprising several bits, each bit of each input data being inserted with its binary one's complement into a respective input word. The positions of the data part in each of the words of each pair of input words and of the output word can be chosen randomly.

The derived operation can be configured to transform the first input word of each pair of input words by replacing the binary one's complement of the input data part of the first input word by the input data part, and to apply the target operation to the transformed first input word and to the second input word of the pair of input words.

Each of the input words and the output word can include two occurrences of a part of one of the two input data or of the output data, respectively, and two occurrences of the binary one's complement of the part of the input data or of the output data, respectively, the data parts being in same positions in the first and second input words of each pair of input words and in the output word, and the binary one's complements of the data part being in same positions in the first and second input words of each pair of input words and in the output word.

The derived operation can be configured to transform the first input word of each pair of input words by replacing one of the two occurrences of the input data part in the first input word by the binary one's complement of the input data part, and by replacing one of the two occurrences of the binary one's complement of the input data part in the first input word by the input data part, and to apply the target operation to the transformed first input word and to the second input word of the pair of input words.

The target operation can include one or a combination of the following operations: Exclusive OR, AND, OR, NOT AND, NOT OR, Exclusive NOT OR, and a substitution operation using a substitution table.

The derived operation can be configured to determine an index word by combining the input words of each pair of input words, and to select the output word in a table using the index word.

One of the input data can be a secret data and the other of the input data can be a data to be processed by a cryptographic operation using the secret data.

The target operation can be an operation or a combination of operations implementing the DES or AES algorithm.

In another general aspect, a device can include a circuit arranged on a medium. The circuit can be configured to: execute a target operation combining a first input data with a second input data, and providing an output data, generate at least two pairs of input words each comprising a first input word and a second input word, the first input word comprising a respective part of the first input data and a binary one's complement of the first input data part, the second input word comprising a respective part of the second input data and a binary one's complement of the second input data part, the parts of the first and second input data being in same positions in the first and second input data words of each word data pair, and the binary one's complements of the parts of the first and second input data being in same positions in the first and second input data words of each word data pair, and apply to each pair of input words a same derived operation providing an output word comprising a part of the output data, resulting from the application of the target operation to the first and second input data parts present in the pair of input words, and a binary one's complement of the output data part.

Implementations can include one or more of the following features. For example, each of the input words of each pair of input words can include a data resulting from a random or pseudo-random number generator. Each input data can be represented in the form of a word comprising several bits, each bit of each input data can be inserted with its binary one's complement into a respective input word. The positions of the data part in each of the words of each pair of input words and of the output word can be chosen randomly.

The derived operation can be configured to transform the first input word of each pair of input words by replacing the binary one's complement of the input data part of the first input word by the input data part, and to apply the target operation to the transformed first input word and to the second input word of the pair of input words.

Each of the input words and the output word can include two occurrences of a part of one of the two input data or of the output data, respectively, and two occurrences of the binary one's complement of the part of the input data or of the output data, respectively, the data parts being in same positions in the first and second input words of each pair of input words and in the output word, and the binary one's complements of the data part being in same positions in the first and second input words of each pair of input words and in the output word.

The derived operation can be configured to transform the first input word of each pair of input words by replacing one of the two occurrences of the input data part in the first input word by the binary one's complement of the input data part, and by replacing one of the two occurrences of the binary one's complement of the input data part in the first input word by the input data part, and to apply the target operation to the transformed first input word and to the second input word of the pair of input words.

The target operation can include one or a combination of the following operations: Exclusive OR, AND, OR, NOT AND, NOT OR, Exclusive NOT OR, and a substitution operation using a substitution table.

The derived operation can be configured to combine the input words of a pair of input words to determine an index word, and to select the output word in a table using the index word.

One of the input data can be a secret data and the other of the input data can be a data to be processed by a cryptographic operation using the secret data.

The target operation can be an operation or a combination of operations implementing the DES or AES algorithm.

In another general aspect, a non-transitory computer-readable medium can carry (include, have stored thereon, etc.) one or more sequences of instructions, which, when executed by one or more processors, can cause the one or more processors to execute a target operation combining a first input data with a second input data, and providing an output data, generate at least two pairs of input words each comprising a first input word and a second input word, the first input word comprising a respective part of the first input data and a binary one's complement of the first input data part, the second input word comprising a respective part of the second input data and a binary one's complement of the second input data part, the parts of the first and second input data being in same positions in the first and second input data words of each word data pair, and the binary one's complements of the parts of the first and second input data being in same positions in the first and second input data words of each word data pair, and apply to each pair of input words a same derived operation providing an output word comprising a part of the output data, resulting from the application of the target operation to the first and second input data parts present in the pair of input words, and a binary one's complement of the output data part.

Implementations can include one or more of the following features. For example, each of the input words of each pair of input words can include a data resulting from a random or pseudo-random number generator. Each input data can be represented in the form of a word comprising several bits, each bit of each input data being inserted with its binary one's complement into a respective input word. The positions of the data part in each of the words of each pair of input words and of the output word can be chosen randomly.

The derived operation can be configured to transform the first input word of each pair of input words by replacing the binary one's complement of the input data part of the first input word by the input data part, and to apply the target operation to the transformed first input word and to the second input word of the pair of input words.

Each of the input words and the output word can include two occurrences of a part of one of the two input data or of the output data, respectively, and two occurrences of the one's complement of the part of the input data or of the output data, respectively, the data parts being in same positions in the first and second input words of each pair of input words and in the output word, and the binary one's complements of the data part being in same positions in the first and second input words of each pair of input words and in the output word.

The derived operation can be configured to transform the first input word of each pair of input words by replacing one of the two occurrences of the input data part in the first input word by the binary one's complement of the input data part, and by replacing one of the two occurrences of the binary one's complement of the input data part in the first input word by the input data part, and to apply the target operation to the transformed first input word and to the second input word of the pair of input words.

The target operation can include one or a combination of the following operations: Exclusive OR, AND, OR, NOT AND, NOT OR, Exclusive NOT OR, and a substitution operation using a substitution table.

The derived operation can be configured to combine the input words of a pair of input words to determine an index word, and to select the output word in a table using the index word.

One of the input data can be a secret data and the other of the input data can be a data to be processed by a cryptographic operation using the secret data.

The target operation can be an operation or a combination of operations implementing the DES or AES algorithm.

The invention claimed is:

1. A method for protecting a target operation executed by a circuit and generating an output data from a combination of first input data with a second input data, and providing an output data, the method comprising:
generating, by the circuit:
a first input word including a respective first input data part of a first input data and a first complemented input data part resulting from applying a Boolean NOT operation to the first input data part of the first input data,
a second input word including a respective second input data part of the first input data and a second complemented input data part resulting from applying the Boolean NOT operation to the second input data part of the first input data,
a third input word including a respective first input data part of a second input data and a third complemented input data part resulting from applying the Boolean NOT operation to the first input data part of the second input data, and
a fourth input word including a respective second input data part of the second input data and a fourth complemented input data part resulting from applying the Boolean NOT operation to the second input data part of the second input data, the first input data parts of the first and second input data and second input data parts of the first and second input data being in a same positions respectively in the first, second, third and fourth input words, and the first, second, third and fourth complemented input data parts being in a same position respectively in the first, second, third and fourth input words;
applying, by the circuit, a derived operation combining the first and third input words to obtain a first output word including:
a first output data part of an output data, which is a result of a target operation applied to the first input data parts of the first and second input data, the output data being a result of the target operation applied to the first input data and the second input data, and
a first complemented output data part resulting from applying the Boolean NOT operation to the first output data part; and
applying, by the circuit, the derived operation to the second and fourth input words to obtain a second output word including:
a second output data part of the output data, which is a result of the target operation applied to the second input data parts of the first and second input data, and
a second complemented output data part resulting from applying the Boolean NOT operation to the second output data part.

2. The method according to claim 1, wherein each of the first, second, third and fourth input words includes a data resulting from a random or pseudo-random number generator.

3. The method according to claim 1, wherein the first and second input data are divided respectively into several first input data parts and several second input data parts, the first and second input data parts being distributed over several input words, each input word including one part from the first or second input data parts, and a complemented part resulting from applying the Boolean NOT operation to the one part, the derived operation being applied to each pair of input words including one input word including one of the first input data parts and one input word including a corresponding one of the second input data parts.

4. The method according to claim 1, wherein each of the first second input data is represented in a form of a word including several bits, each bit of each of the first and second input data being inserted into a respective input word with a complemented bit resulting from applying the Boolean NOT operation to the bit, the derived operation being applied to pairs of input words including an input word including a bit of the first input data and an input word including a corresponding bit of the second input data.

5. The method according to claim 1, wherein the position of the first input data parts of the first and second input data and the position of the first and second input data parts of the second input data, in the first, second, third and fourth input words, respectively, and the position of the first and second output data parts in the first and second output words, respectively, are chosen randomly.

6. The method according to claim 1, wherein the first, second, third and fourth input words and the first and second output words include:
two occurrences of the first and second input data parts of the first input data, of the first and second input data parts of the second input data, and of the first and second output data parts, respectively, and
two occurrences of the first, second, third and fourth complemented input data parts, and of the first and second complemented output data parts, respectively.

7. The method according to claim 6, wherein the derived operation is configured, when applied to two input words each comprising a two occurrences of an input data part and two occurrences of a complemented input data part, to transform one of the two input words by replacing one of the two occurrences of the input data part in the one of the two input words by the complemented input data part of the one of the two input words, and by replacing one of the two occurrences of the complemented input data part in the one of the two input words by the input data part of the one of the two input words, and to apply the target operation to the transformed input word and to the other of the two input words.

8. The method according to claim 1, wherein the target operation includes at least one of the following operations:
exclusive OR;
AND;
NOT AND;
NOT OR; or
a substitution operation using a substitution table.

9. The method according to claim 1, wherein applying the derived operation to the first and third input words and to the second and fourth input words includes:
   combining the first input word with the third input word to determine a first index word;
   combining the second input word with the fourth input word to determine a second index word;
   selecting the first output word in a table using the first index word; and
   selecting the second output word in the table using the second index word.

10. The method according to claim 1, wherein one of the first input data and the second input data is a secret data and the other of the first input data and the second input data is a data to be processed by a cryptographic operation, using the secret data.

11. The method according to claim 1, wherein the target operation is an operation or a combination of operations implementing a DES algorithm or an AES algorithm.

12. The method according to claim 1, wherein the derived operation is configured when applied to two input words each comprising an input data part and a complemented input data part, to transform one the of the two input words by replacing the complemented input data part of the one of the two input words by the input data part of the one of the two input words, and to apply the target operation to the transformed input word and to the other of the two input words.

13. A circuit including one or more processors, comprising:
   the one or more processors configured to:
      generate:
         a first input word including a respective first input data part of a first input data and a first complemented input data part resulting from applying a Boolean NOT operation to the first input data part of the first input data,
         a second input word including a respective second input data part of the first input data and a second complemented input data part resulting from applying the Boolean NOT operation to the second input data part of the first input data,
         a third input word including a respective first input data part of a second input data and a third complemented input data part resulting from applying the Boolean NOT operation to the first input data part of the second input data, and
         a fourth input word including a respective second input data part of the second input data and a fourth complemented input data part resulting from applying the Boolean NOT operation to the second input data part of the second input data, the first input data parts of the first and second input data and the second input data parts of the first and second input data being in a same position respectively in the first, second, third and fourth input words, and the first, second, third and fourth complemented input data parts being in a same position respectively in the first, second, third and fourth input words;
      apply a derived operation combining the first and third input words to obtain a first output word including:
         a first output data part of an output data, which is a result of a target operation applied to the first input data parts of the first and second input data, the output data being a result of the target operation applied to the first input data and the second input data, and
         a first complemented output data part resulting from applying the Boolean NOT operation to the first output data part; and
      apply the derived operation to the second and fourth input words to obtain a second output word including:
         a second output data part of the output data, which is a result of the target operation applied to the second input data parts of the first and the second input data, and
         a second complemented output data part resulting from applying the Boolean NOT operation to the second output data part.

14. The circuit according to claim 13, wherein each of the first, second, third and fourth input words include a data resulting from a random or pseudo-random number generator.

15. The circuit according to claim 13, wherein the first and second input data are divided respectively into several first and second input data parts, the first and second data parts being distributed over several input words, each input word including one part of the first or second input data parts, and a complemented part resulting from applying the Boolean NOT operation to the one part, the derived operation being applied to each pair of input words including one input word including one of the first input data parts and one input word including a corresponding one of the second input data parts.

16. The circuit according to claim 13, wherein each of the first input data and the second input data is represented in a form of a word including several bits, each bit of each of the first input data and the second input data being inserted into a respective input word with a complemented bit resulting from applying the Boolean NOT operation to the bit, the derived operation being applied to pairs of input words including an input word including a bit of the first input data and an input word including a bit of the second input data.

17. The circuit according to claim 13, wherein the positions of the first and second input data parts of the first input data and the first and second input data parts of the second input data, in the first, second, third and fourth input words, respectively, and positions of the first and second output data parts in the first and second output words, respectively, are chosen randomly.

18. The circuit according to claim 13, wherein the first, second, third and fourth input words and the first and second output words include:
   two occurrences of the first and second input data parts of the first input data, of the first and second input data parts of the second input data, and of the first and second output data parts, respectively, and
   two occurrences of the first, second, third and fourth complemented input data parts, and of the first and second complemented output data parts, respectively.

19. The circuit according to claim 18, wherein the derived operation is configured, when applied to two input words each comprising a complemented input data part, to transform one of the two input words by replacing one of the two occurrences of the input data part in the one of the two input words by the complemented input data part in the one of the two input words, and by replacing one of the two occurrences of the complemented input data part in the one of the two input words by the input data part of the one of the two input words, and to apply the target operation to the transformed input word and to the other of the two input words.

20. The circuit according to claim 13, wherein the target operation includes at least one of the following operations:
exclusive OR;
AND;
NOT AND;
NOT OR; or
a substitution operation using a substitution table.

21. The circuit according to claim 13, wherein the derived operation is configured to:
combine the first input word with the third input word to determine a first index word;
combine the second input word with the fourth input word to determine a second index word;
select the first output word in a table using the first index word; and
select the second output word in the table using the second index word.

22. The circuit according to claim 13, wherein one of the first input data and the second input data is a secret data and the other of the first input data and the second input data is a data to be processed by a cryptographic operation, using the secret data.

23. The circuit according to claim 13, wherein the target operation is an operation or a combination of operations implementing a DES algorithm or an AES algorithm.

24. The circuit according to claim 13, wherein the derived operation is configured, when applied to two input words each comprising an input data part and a complemented input data part, to transform one of the two input words by replacing the complemented input data part of the one of the two input words by the input data part of the one of the two input words, and to apply the target operation to the transformed first input word and to the other of the two input words.

25. A device, comprising:
a circuit configured to:
generate:
a first input word including a respective first input data part of a first input data and a first complemented input data part resulting from applying a Boolean NOT operation to the first input data part of the first input data,
a second input word including a respective second input data part of the first input data and a second complemented input data part resulting from applying the Boolean NOT operation to the second input data part of the first input data,
a third input word including a respective first input data part of a second input data and a third complemented input data part resulting from applying the Boolean NOT operation to the first input data part of the second input data, and
a fourth input word including a respective second input data part of the second input data and a fourth complemented input data part resulting from applying the Boolean NOT operation to the second input data part of the second input data, the first input data parts of the first and second input data and the second input data parts of the first and second input data being in a same position respectively in the first, second, third and fourth input words, and the respective first, second, third and fourth complemented input data parts being in a same position respectively in the first, second, third and fourth input words;
apply a derived operation combining the first and third input words to obtain a first output word including:
a first output data part of an output data, which is a result of a target operation applied to the first input data parts of the first and second input data, the output data being a result of the target operation applied to the first input data and the second input data, and
a first complemented output data part resulting from applying the Boolean NOT operation applied to the first output data part; and
apply the derived operation to the second and fourth input words to obtain a second output word including:
a second output data part of the output data, which is a result of the target operation applied to the second input data parts of the first and second input data, and
a second complemented output data part resulting from applying the Boolean NOT operation to the second output data part.

26. A non-transitory computer-readable medium carrying one or more sequences of instructions, which when executed by one or more processors, cause the one or more processors to:
generate:
a first input word including a respective first input data part of a first input data and a first input complemented data part resulting from applying a Boolean NOT operation to the first input data part of the first input data,
a second input word including a respective second input data part of the first input data and a second complemented input data part resulting from applying the Boolean NOT operation to the second input data part of the first input data,
a third input word including a respective first input data part of a second input data and a third complemented input data part resulting from applying the Boolean NOT operation to the first input data part of the second input data, and
a fourth input word including a respective second input data part of the second input data and a fourth complemented input data part resulting from applying the Boolean NOT operation to the second input data part of the second input data, the first input data parts of the first and second input data and second input data parts of the first and second input data being in a same position respectively in the first, second, third and fourth input words, and the first, second, third and fourth complemented input data parts being in a same position respectively in the first, second, third and fourth input words;
apply a derived operation combining the first and third input words to obtain a first output word including:
a first output data part of an output data, which is a result of a target operation applied to the first input data parts of the first and second input data, the output data being a result of the target operation applied to the first input data and the second input data, and
a first complemented output data part resulting from applying the Boolean NOT operation applied to the first output data part; and
apply the derived operation to the second and fourth input words to obtain a second output word including:
a second output data part of the output data, which is a result of the target operation applied to the second input data parts of the first and second input data, and a second complemented output data part resulting from applying the Boolean NOT operation to the second output data part.

\* \* \* \* \*